Dec. 5, 1967  A. DEL PERUGIA  3,356,113
METHOD, APPARATUS AND MACHINE FOR DELIMBING
AND SECTIONING A STANDING TREE
Filed Feb. 9, 1965  15 Sheets-Sheet 1

INVENTOR.
André del Perugia
BY
Ernest M. Anderson
ATTORNEY

Dec. 5, 1967

A. DEL PERUGIA 3,356,113

METHOD, APPARATUS AND MACHINE FOR DELIMBING
AND SECTIONING A STANDING TREE

Filed Feb. 9, 1965

INVENTOR
André del Perugia
BY
Ernest M Anderson
ATTORNEY

Dec. 5, 1967  A. DEL PERUGIA  3,356,113
METHOD, APPARATUS AND MACHINE FOR DELIMBING
AND SECTIONING A STANDING TREE
Filed Feb. 9, 1965  15 Sheets-Sheet 3

INVENTOR
André del Perugia
BY
Ernest M Anderson
ATTORNEY

INVENTOR.
André del Perugia
BY
Ernest M Anderson
ATTORNEY

Dec. 5, 1967  A. DEL PERUGIA  3,356,113
METHOD, APPARATUS AND MACHINE FOR DELIMBING
AND SECTIONING A STANDING TREE
Filed Feb. 9, 1965  15 Sheets-Sheet 5

INVENTOR
André del Perugia
BY
Ernest M Anderson
ATTORNEY

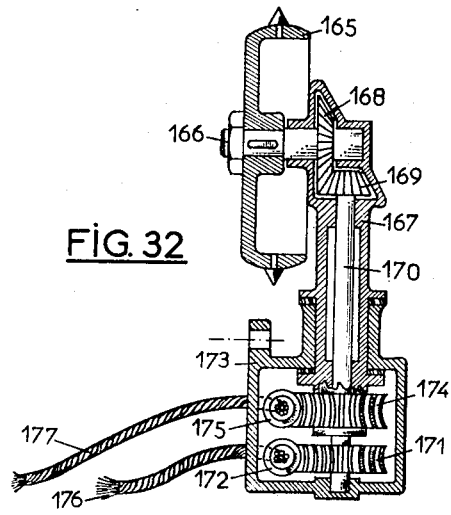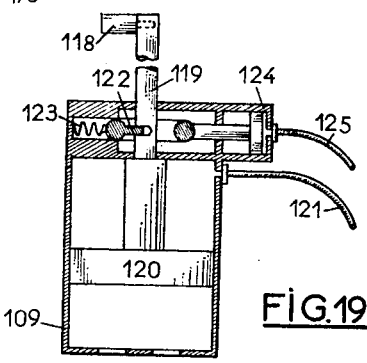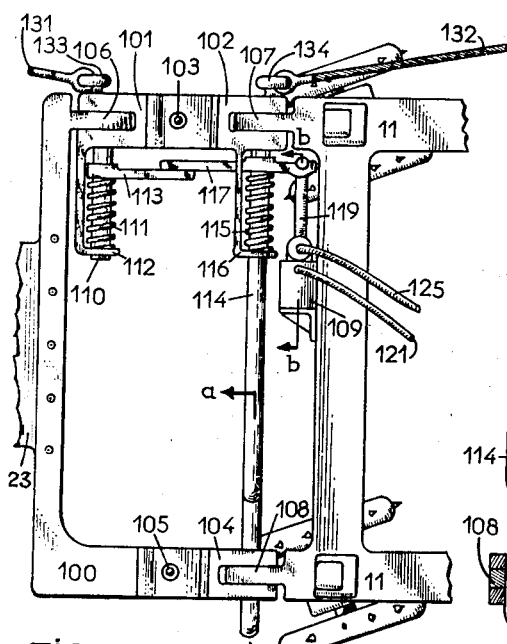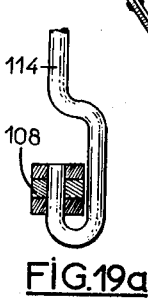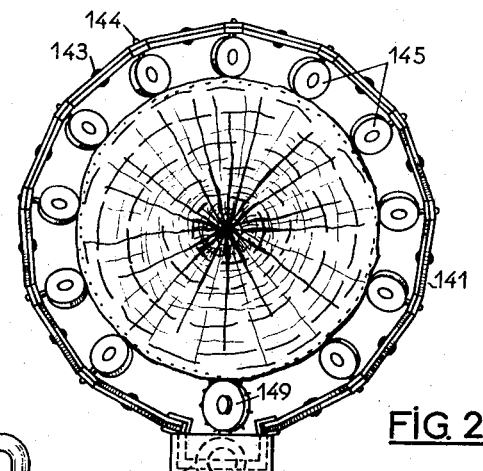

Dec. 5, 1967      A. DEL PERUGIA      3,356,113
METHOD, APPARATUS AND MACHINE FOR DELIMBING
AND SECTIONING A STANDING TREE
Filed Feb. 9, 1965      15 Sheets-Sheet 8
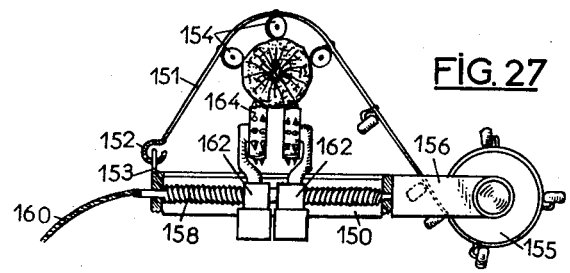
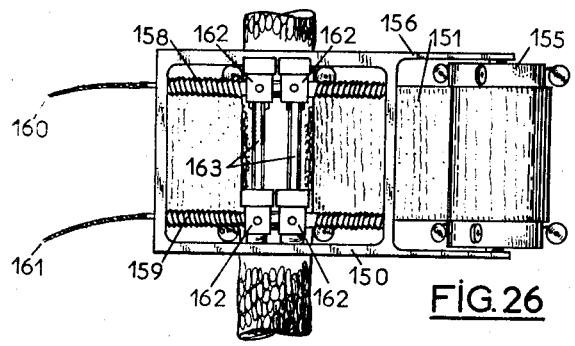
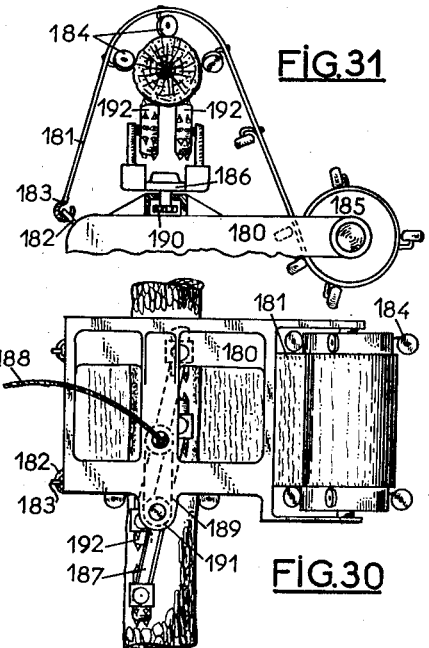
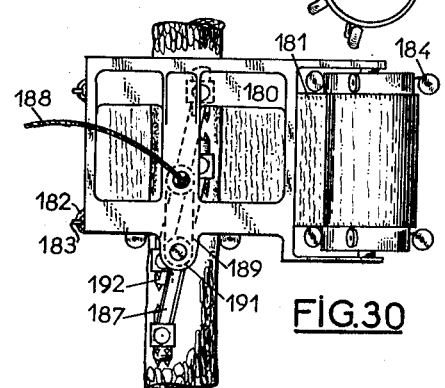
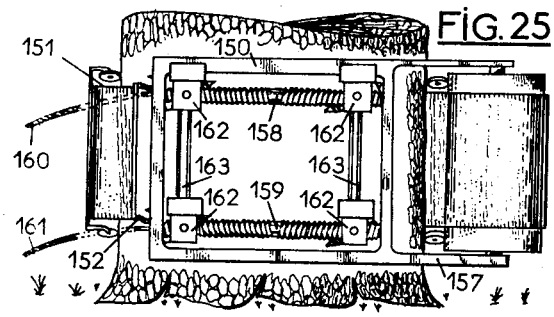
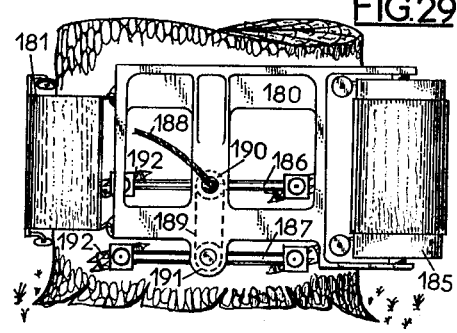
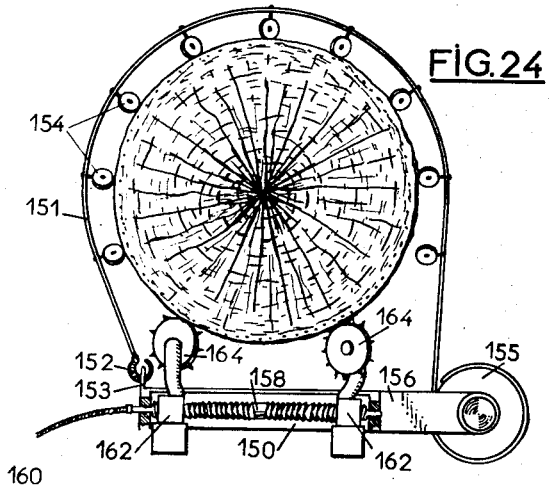
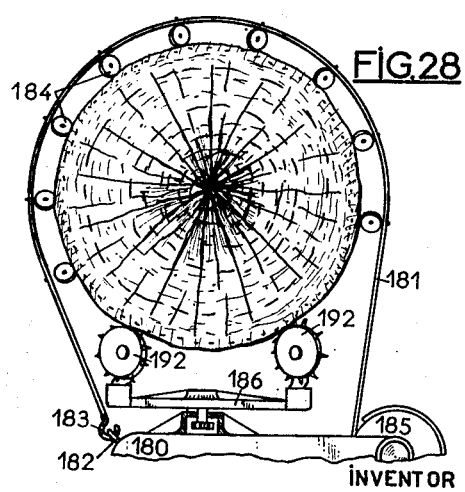
INVENTOR
André del Perugia
BY
Ernest M Anderson
ATTORNEY

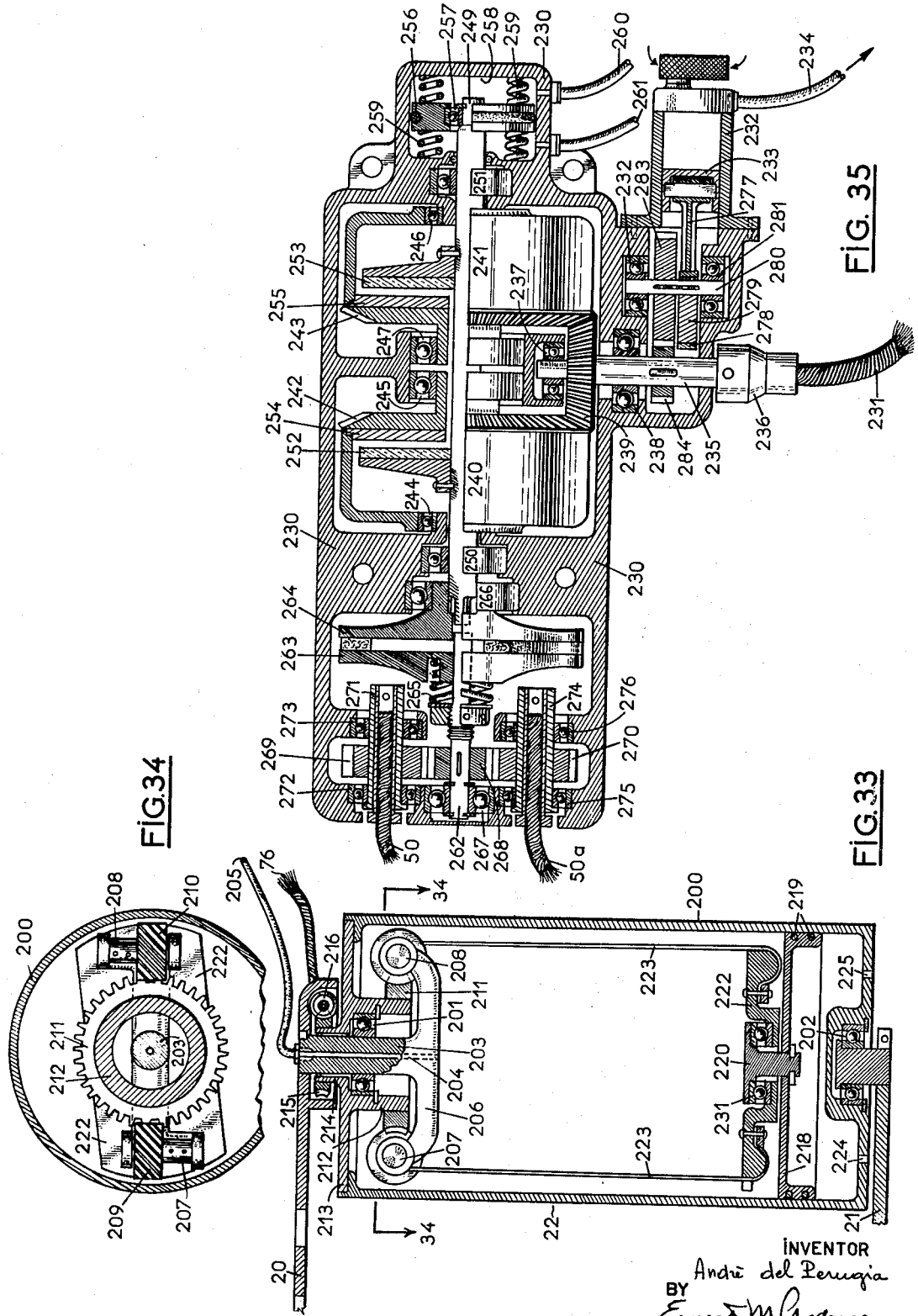

Dec. 5, 1967 A. DEL PERUGIA 3,356,113
METHOD, APPARATUS AND MACHINE FOR DELIMBING
AND SECTIONING A STANDING TREE
Filed Feb. 9, 1965 15 Sheets-Sheet 10

INVENTOR
André del Perugia
BY
Ernest M Anderson
ATTORNEY

Dec. 5, 1967

A. DEL PERUGIA 3,356,113

METHOD, APPARATUS AND MACHINE FOR DELIMBING
AND SECTIONING A STANDING TREE

Filed Feb. 9, 1965

INVENTOR
André del Perugia
BY
Ernest M Anderson
ATTORNEY

Dec. 5, 1967     A. DEL PERUGIA     3,356,113
METHOD, APPARATUS AND MACHINE FOR DELIMBING
AND SECTIONING A STANDING TREE
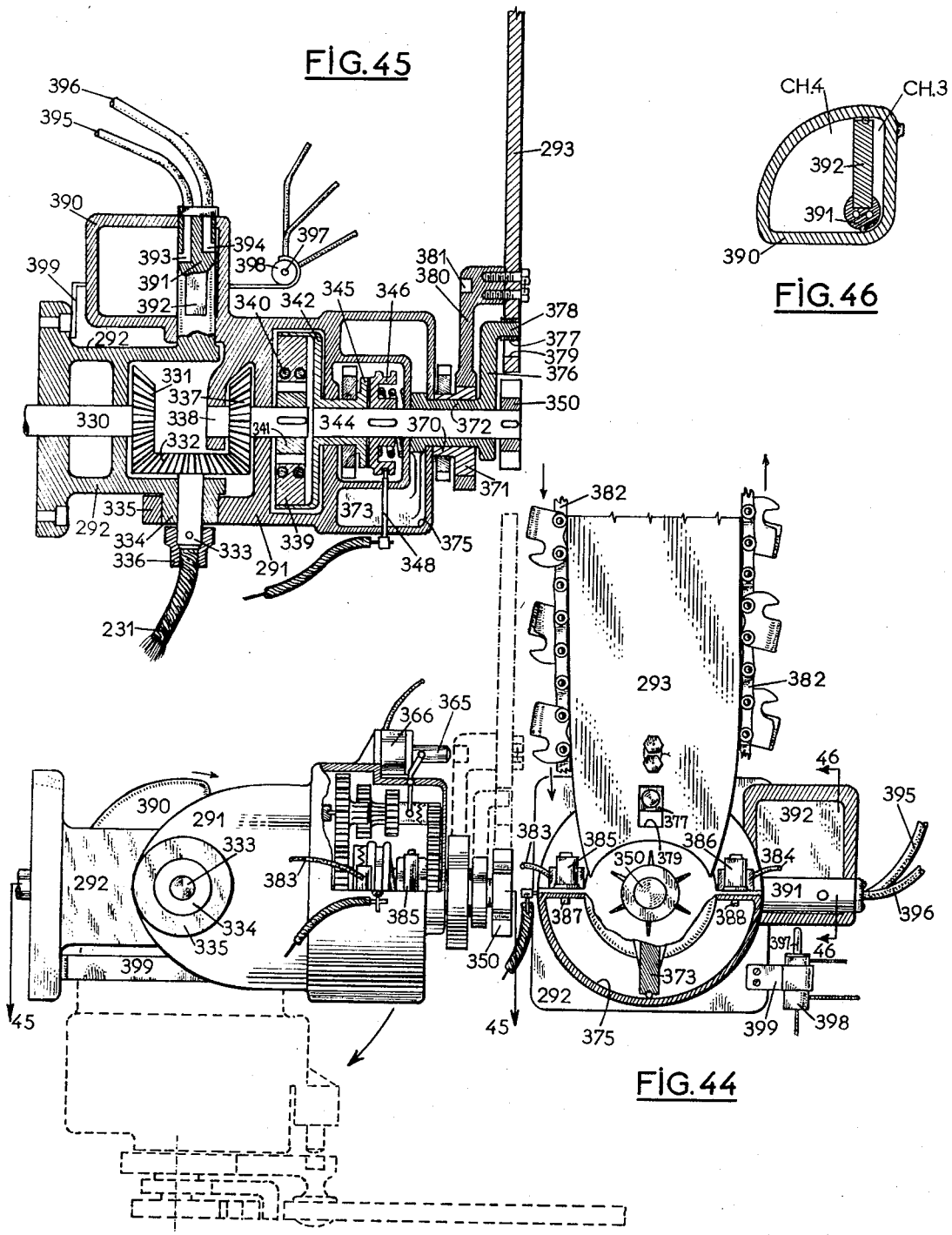

Dec. 5, 1967 A. DEL PERUGIA 3,356,113
METHOD, APPARATUS AND MACHINE FOR DELIMBING
AND SECTIONING A STANDING TREE
Filed Feb. 9, 1965 15 Sheets-Sheet 14

INVENTOR
André del Perugia
BY
Ernest M Anderson
ATTORNEY

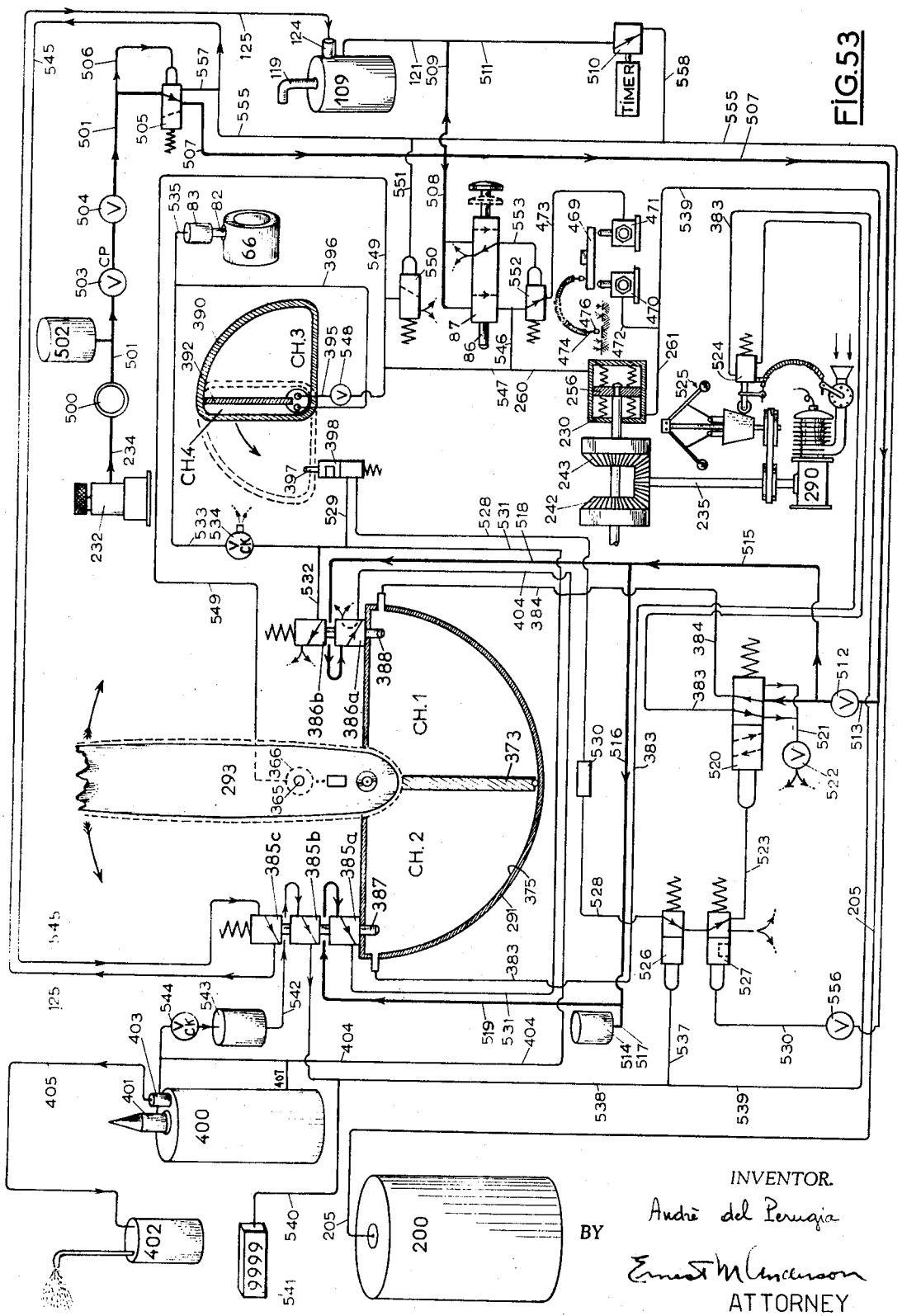

United States Patent Office 3,356,113
Patented Dec. 5, 1967

3,356,113
METHOD, APPARATUS AND MACHINE FOR DE-
LIMBING AND SECTIONING A STANDING
TREE
André del Perugia, Sonora, Calif. (3020 Washington St.,
San Francisco, Calif. 94115)
Filed Feb. 9, 1965, Ser. No. 431,351
47 Claims. (Cl. 144—34)

ABSTRACT OF THE DISCLOSURE

Apparatus and methods for delimbing and sectioning a standing tree. A motor-driven chain saw mounted on a tree-climbing device severs the limbs of a tree as the machine ascends the tree trunk in a helical path. At a predetermined height of climb, determined by the diameter of the trunk, the cutting head of the chain saw pivots into a horizontal cutting plane and tops the tree. Then the machine begins a linear descent with periodic interruptions for severing the upper section of the trunk from the lower portion that supports the machine.
Control apparatus is provided to adjust the angle of helical climb as a function of the instantaneous diameter of the tree at which the machine is positioned; a second control means permits regulation of the minimum diameter of tree trunk; and a third control device is provided to regulate the length of trunk sections cut by the apparatus. Means are also provided for counting the trunk sections cut by the apparatus and for marking the end of each trunk section as it is severed.

This invention generally relates to a machine and apparatus for delimbing and sectioning a standing tree. The machine, and its related parts, are particularly useful in connection with harvesting pine trees for pulpwood, although various other purposes will be recognized by those persons generally engaged in work relating to cutting timber.

In brief, the invention described in this application is embodied in a machine that automatically delimbs, tops and sections a tree. The operation of the machine is completely automatic from the time it is mounted near the base of a selected tree until the time the machine returns to a point near ground level. In operation, the machine will climb the tree to which it is mounted in a spiral path, the angle of climb increasing as the circumference of the tree becomes smaller. As the machine climbs the tree, the limbs of the tree are severed close to the trunk, and as the limbs fall to the ground they form a cushioning bed for trunk sections that are later cut as the machine descends the tree. After the machine reaches a given height, which is governed by the circumference of the tree at such height, the main pole or trunk is topped and the machine begins its descent. The machine's descent is periodically interrupted at regular intervals and the section immediately above the machine is severed from the lower trunk portion. Each time an upper section is cut it is dislodged and simultaneously marked for identification.

One of the older and more conventional methods employed for harvesting pine trees requires that an operator be ever present during the sectioning of a tree. This method, similar to the present invention, broadly involves the use of a chain saw that is driven by a gas engine. The conventional operation is somewhat obvious, however, in that the operator first clears away brush and low hanging branches on either side of a tree trunk and then fells the tree, delimbs the branches, tops the tree and "bucks" the trunk into sections, each step being taken in that approximate order. The manual labor required to carry out this method is time taking and expensive, and for this reason it is uneconomical, especially when compared to the method and apparatus hereinafter described.

Recent developments have been made in producing a machine that automatically cuts and sections trees. This machine, however, is extremely heavy weighing approximately ten tons. The machine is mounted on tracks or heavy wheels and is powerized by an expensive diesel engine. The size and weight of the machine necessitate that the ground be firm and sufficiently level with no obstructions. It is further necessary that there be good access roads and bridges into a forest area that is to be cut. It is for these reasons that the machine has limited application and can be used only in selected areas.

It is further recognized that machines have been devised for climbing and delimbing a given tree. As far as now known, however, these machines are incapable of performing the total operation of delimbing a tree and also sectioning the tree while it is yet standing. Moreover, devices of this type are not capable of adjusting their rate of climb as does applicant's invention and, therefore, the inherent delimbing operation as employed by the earlier machines is comparatively slow.

In view of the above brief description and comparison with prior art structures, it is to be understood that a principal object of the present invention is to provide a small compact machine capable of delimbing and sectioning a tree without requiring manual attention; a machine having high mobility and capable of being worked wherever a man can travel on foot; a machine having a low initial cost and one which is relatively inexpensive to maintain and operate; a machine having a high rate of processing and one which is useful in severing trees of different lengths.

It is another object of this invention to provide a machine for delimbing and sectioning a standing tree comprising a cutting means that may be positioned either in the vertical for delimbing branches or positioned in a horizontal plane for topping and sectioning a tree.

Another object is to provide a machine of the type described comprising means for climbing and descending a tree having tree engaging, rotatably driven, toothed wheels and further including means for adjusting the angle of horizontal incline of each toothed wheel.

Another object of this invention is to provide a machine of the kind described comprising means for climbing a tree having tree engaging toothed wheels, each wheel rotatably driven upon a pivoted end rotatable leg, and further including means for pivotally positioning each leg and maintaining substantial perpendicularity between the axis of leg rotation and the surface of the tree contacted by the wheel it supports.

Another object is to provide a machine of the kind described comprising means for climbing a tree having tree engaging wheels and means responsive to the peripheral dimension of the tree at the height climbed for adjusting and setting the angle of horizontal incline of each toothed wheel.

Another object is to provide a machine of the kind described comprising means for climbing a tree including tree engaging wheels whose angle of horizontal incline may be adjusted, and further including means for locking each toothed wheel when oriented at an angle of climb substantially perpendicular to the horizontal.

Another object is to provide a machine of the kind described comprising means for climbing a tree including tree engaging wheels whose angle of incline may be adjusted and set in response to the peripheral dimension of the tree at the height climbed, and further wherein the angle of climb of each wheel increases as the machine ascends a tree to produce a logarithmic spiral of climb for maintaining an equal height of climb each revolution of the tree trunk.

Another object is to provide a machine of the kind described and further including means for dislodging an upper length of the tree after such length has been severed from a lower trunk portion.

Another object to this invention is to provide a machine of the kind described and further including means for marking the end of each severed upper length of the trunk as it is dislodged from a lower portion.

Another object is to provide a machine of the kind described including a mounting for the machine allowing the cutting means to be used for severing the stump or portion of a tree trunk closest to the ground.

Another object is to provide a machine of the kind described having a control means for actuating the cutting means to section a tree trunk into predetermined lengths as the machine descends.

Another object is to provide a machine of the kind described including a control means for initiating periodic and alternate actuation of a cutting means and a tree climbing and descending means to effect topping and sectioning of a tree as the machine descends from a point of highest climb.

Another object of the invention is to provide a machine of the kind described including a control means responsive to the peripheral diameter of a tree to which the machine is mounted for limiting the machine's ascent.

It is another object of this invention to provide a machine including apparatus for climbing and descending a tree comprising a plurality of toothed drive wheels rotatably mounted on a support, a tensioning drum rotatably mounted to said support, a flexible connection secured at one end to said tensioning drum and disconnectably joined at its other end to the support as to encircle a tree, caster assemblies mounted to said flexible connection and arranged to make contact with the surface of a tree, and means for applying a torque to said tensioning drum, thereby winding up the flexible connection and embracing the tree in supporting fashion.

Another object is to provide apparatus for climbing and descending a tree of the kind described wherein each toothed wheel is mounted to a support by means allowing adjustment in its angle of climb, and further comprising an operating means responsive to the circumference of a tree at the elevation climbed for actuating and adjusting the angle of climb for each toothed wheel.

Another object is to provide an apparatus for climbing and descending a tree of the kind described and further including a resilient drive connection between a tensioning drum and means for adjusting the angle of climb for each toothed wheel, said resilient drive connection allowing the drum to rotate while the toothed wheels are held in a locked, vertically aligned position.

Another object is to provide apparatus for climbiing and descending a tree of the kind described including a gear connection between means for adjusting the angle of climb for each toothed wheel and a tensioning drum, said gear connection having a pair of elliptical gears for positioning the toothed wheels in non-linear relationship to the rotation of the tensioning drum as to produce a logarithmic spiral of climb, the angle of climb increasing as the apparatus ascends a tree.

Another object is to provide an apparatus for climbing and descending a tree of the kind described including a machine support comprising a plurality of rectangular links articulately joined, one to another, to form a linkage assembly.

Another object is to provide apparatus for climbing and descending a tree of the kind described having caster assemblies resiliently mounted to a flexible connection for embracing a tree, each caster assembly being mounted to the flexible connection by a vertical support arm and having a spring support rotatably mounted at one end to said arm upon a horizontal axis and having its other end secured to a caster assembly.

Another object of this invention is to provide apparatus for climbing and descending a tree of the kind described including means for remotely effecting a disconnection between a flexible connection that embraces a tree and a machine support, and further including safety means for lowering the apparatus in the event of a power failure.

A still further object of this invention is to provide a motor driven chain saw having an elongated saw frame that may be positioned in vertical and horizontal positions while the motor drive unit to which it is connected is held stationary.

Another object is to provide a motor driven chain saw of the type described having an elongated saw frame supported on a circular cam, said cam being eccentrically mounted and rotated on the support axis for said saw frame as to produce a rocking action of the saw frame.

Another object is to provide a motor driven chain saw of the kind described having an elongated saw frame pivotally supported and adapted to be rocked upon its support, and further including means for locking the saw frame to its support housing when said saw frame is in a predetermined vertical cutting plane.

Another object is to provide a motor driven chain saw of the kind described including fluid chamber devices for selectively pivoting an elongated saw frame upon either one of two pivot axes.

It is still a further object of this invention to provide a machine of the kind described having a toothed drive wheel and a cutting means, and further including apparatus for initiating a cutting operation of the machine comprising a computer having an input linearly proportional to the rotation of the toothed drive wheel, a control linearly proportional to the angle of incline of the toothed wheel, and an output linearly proportional to the vertical length of a tree traveled by the machine, said output being connected to means for operating the cutting means after said machine travels a predetermined length down the trunk of a tree.

Another object is to provide a machine of the kind described having a toothed drive wheel and a cutting means, and further including an apparatus for initiating a cutting operation of the machine, said apparatus comprising a plurality of cams rotated in linear relationship to the distance traveled by the machine, and a cam follower mounted for selective engagement with the peripheral surface of one of said cams for operating a control circuit to initiate a cutting operation.

It is a further object of this invention to provide a timing device adapted for use in a machine of the kind described, and comprising a plurality of eccentric cams rotatably mounted relative to each other upon a common axis, means for selectively driving one of said cams, and including a cam follower mounted for selective engagement with the peripheral surface of one of said cams, said cam follower being adapted for periodically operating a control in timed relation to the rotation of a selected cam.

It is another object of this invention to provide methods for delimbing and sectioning a standing tree by means of a conventional cutting device, said method reducing the time ordinarily required for delimbing and sectioning a tree using conventional methods.

Other objects of this invention will become apparent in view of the following detailed description and the accompanying drawings.

In the drawings forming a part of this application and in which like parts are identified by like reference numerals throughout the same, FIGS. 1–6 illustrate various sequential steps and positions of the cutting machine during the delimbing and sectioning of a standing tree: FIG. 1 shows the machine mounted to a tree having its cutting blade positioned in a vertical plane for delimbing the tree as the machine ascends the tree in a spiral path; FIG. 2 shows the cutting means pivoted 90° on an axis perpendicular to the vertical cutting plane, as an intermediate position for placing the cutting means in a horizontal cutting plane as shown in FIG. 3; FIGS. 4 and 4a illustrate the operations of dislodging the topped portion of a tree and a cut trunk section, respectively; FIG. 5 illustrates the lowest position of the machine while it is cutting the next to last trunk section; and FIG. 6 shows the position of the saw machine after it has been manually lowered to a position for cutting the last section or stump;

Figure 8:
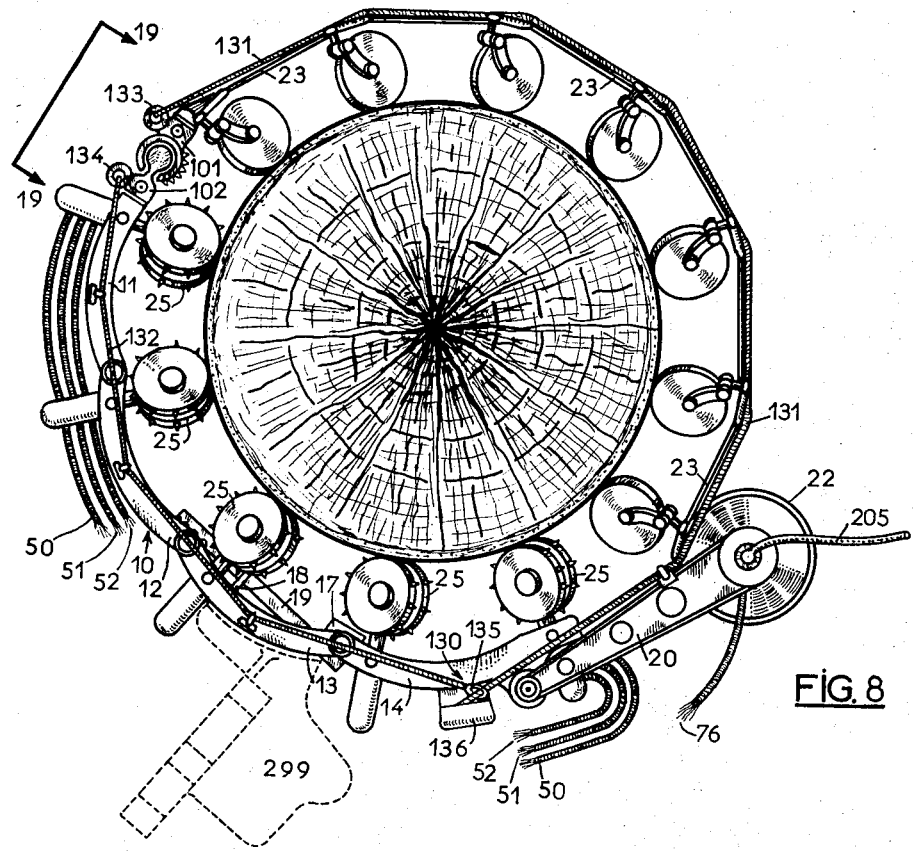
FIG. 8 is a top plan view of the apparatus shown in FIG. 7.
Figure 47:
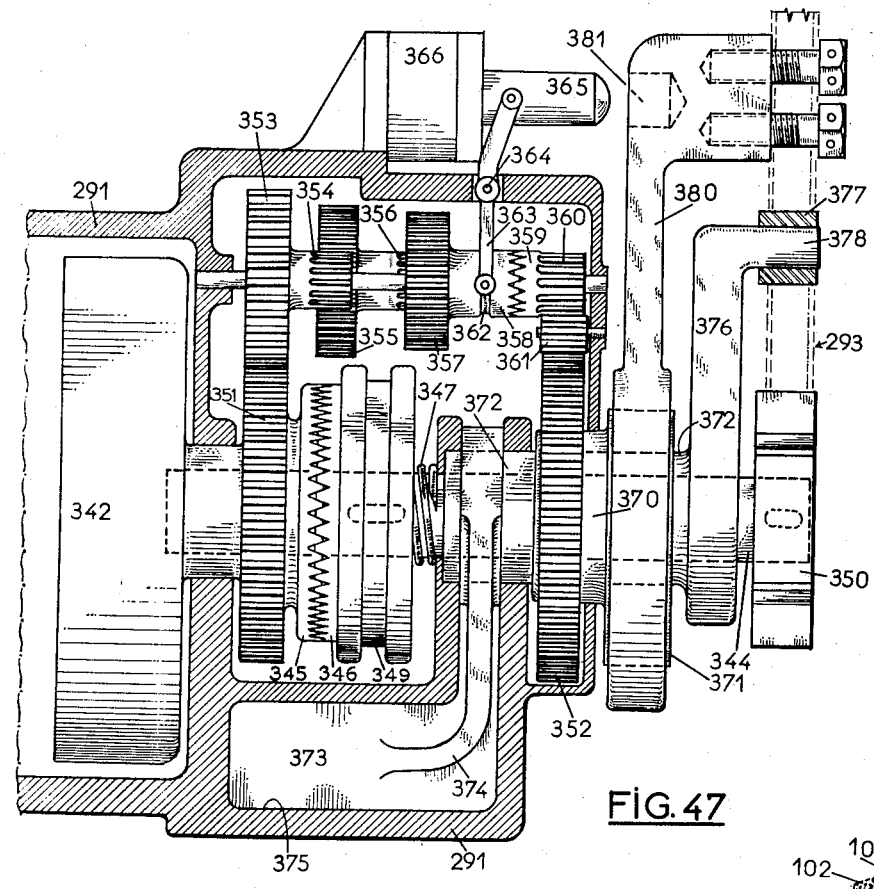
Figure 48:
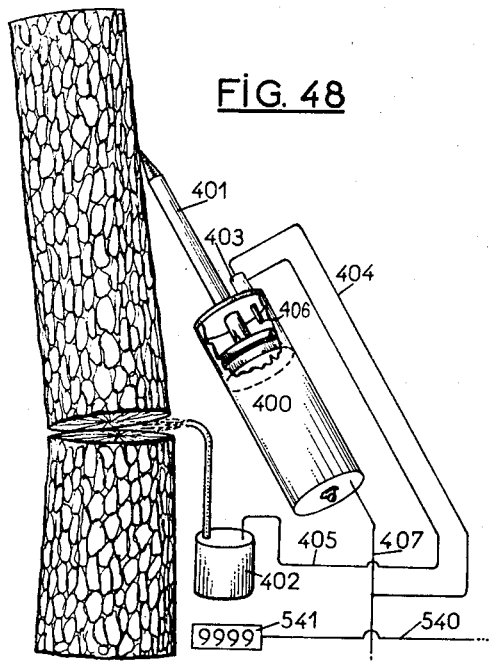
Figure 36:
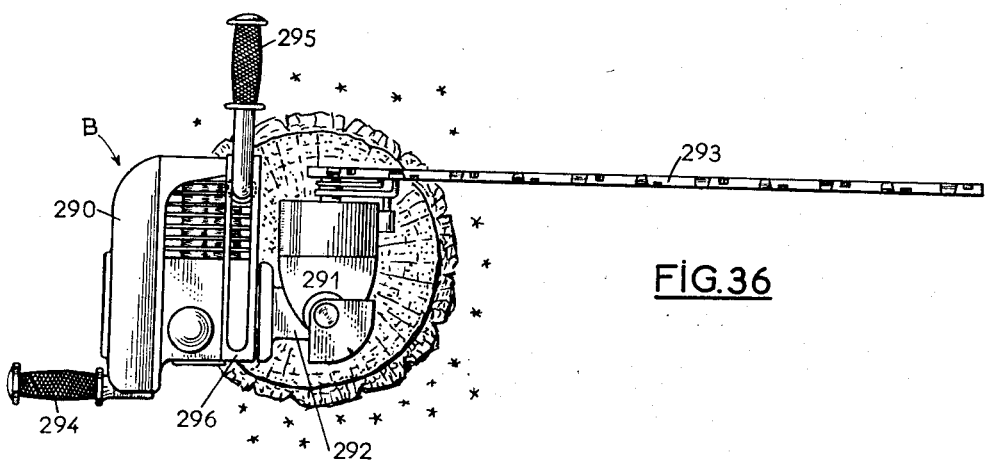
Figure 37:
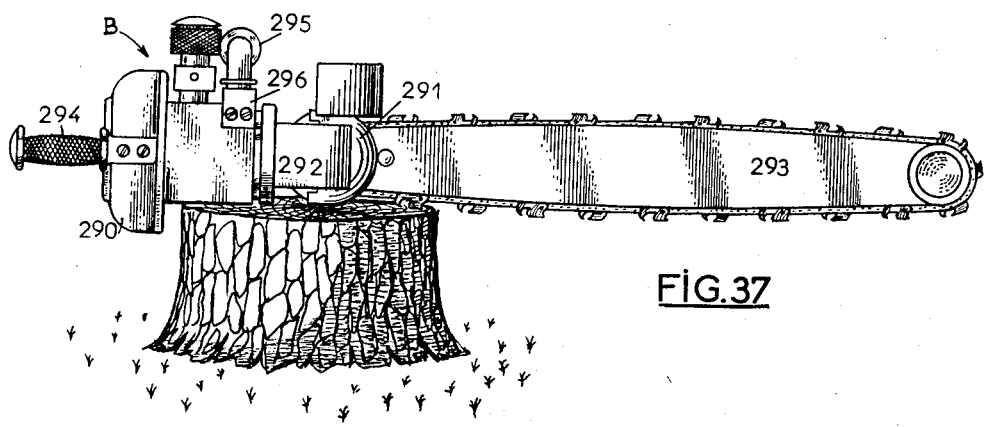
Figure 41:
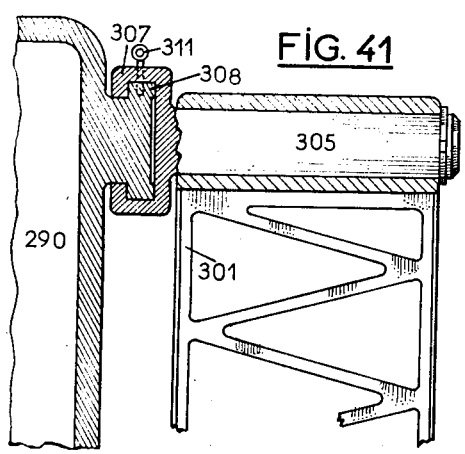
Figure 42:
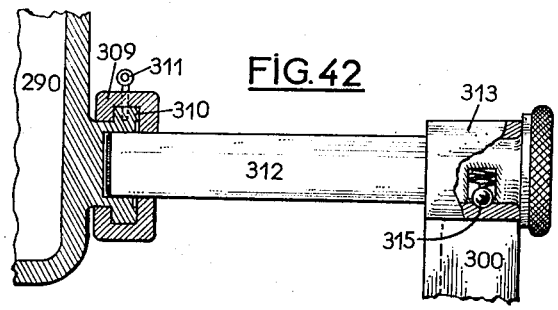
Figure 40:
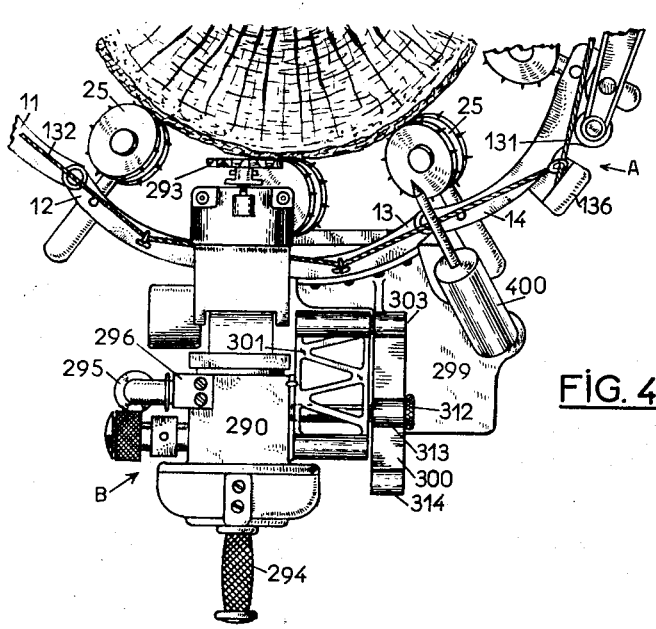
Figure 38:
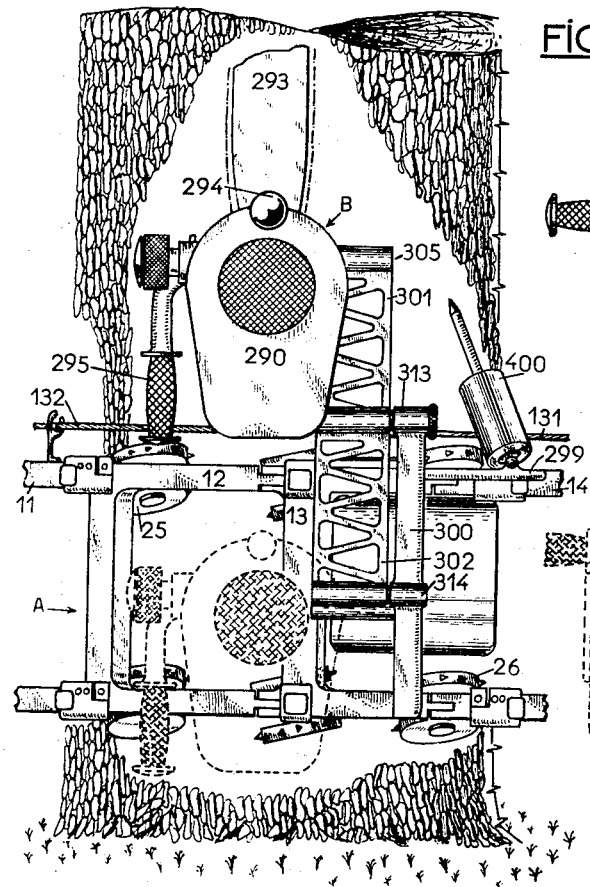
Figure 39:
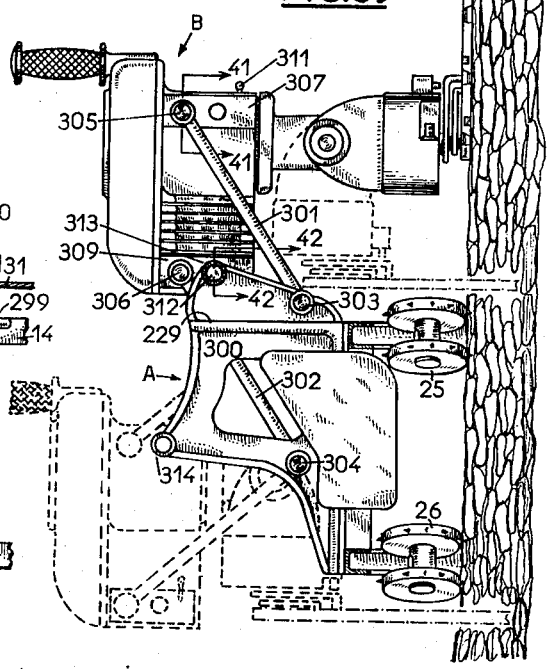
Figure 49:
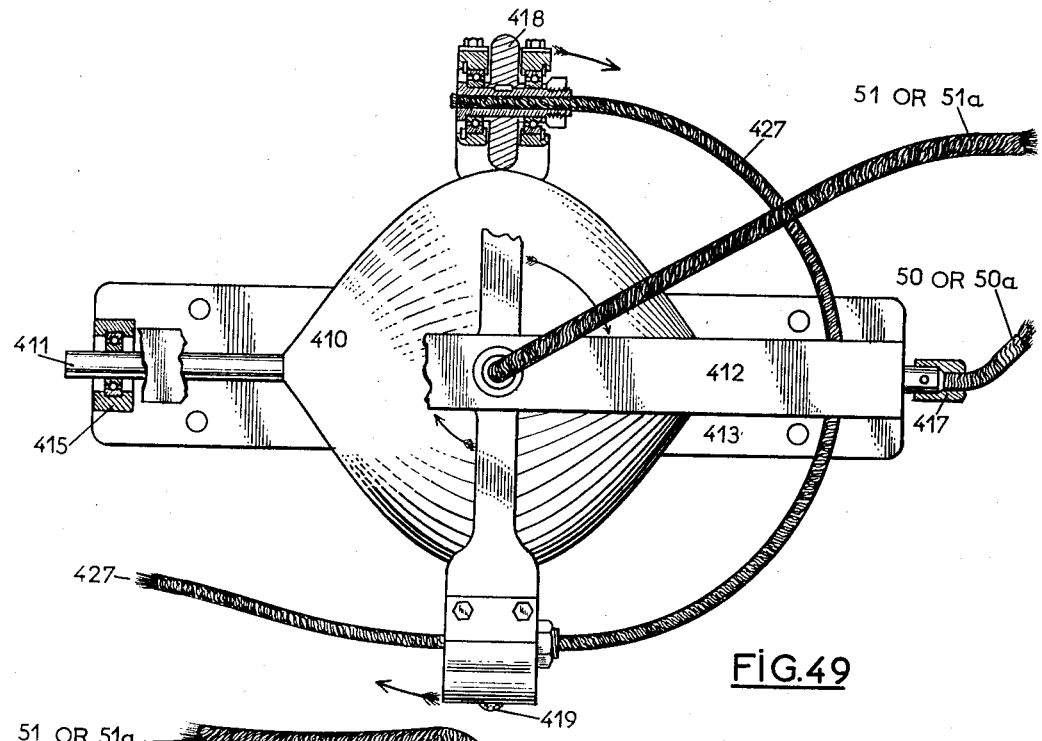
Figure 50:
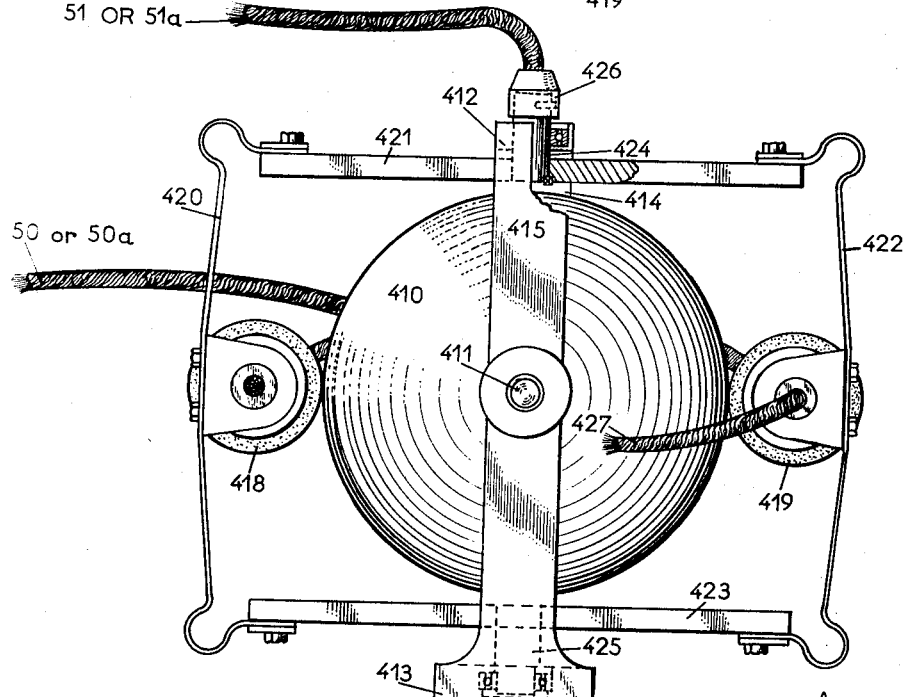
Figure 52:
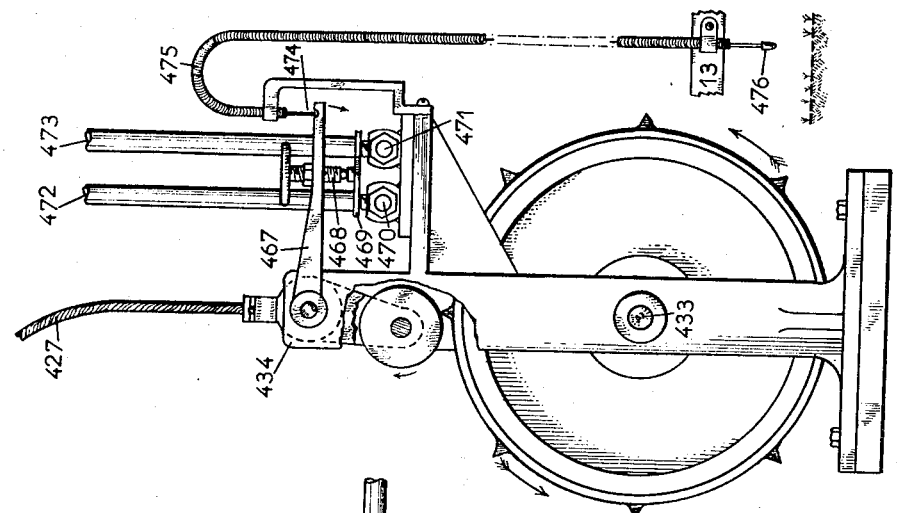
Figure 51:
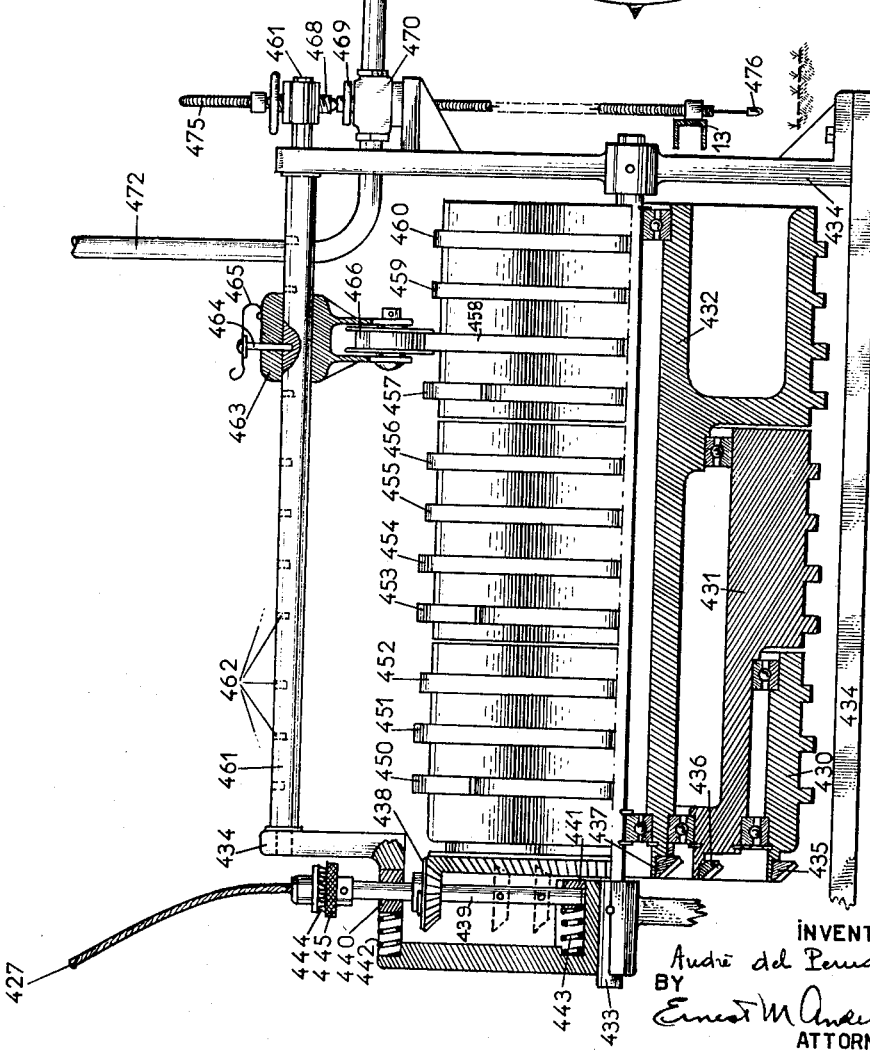

FIGS. 19, 19a and 19b are detail views illustrating the releasable connection that joins the flexible belt to the support of the cutting means, FIG. 19 being an elevation as viewed along line 19—19 of FIG. 8, and FIGS. 19a and 19b being sections taken on lines a—a and b—b of FIG. 19;

FIGS. 20-23 illustrate a second embodiment of a means for climbing and descending a tree;

FIGS. 24-27 illustrate a third embodiment of a means for climbing and descending a tree;

FIGS. 28-31 illustrate a fourth embodiment of a means for climbing and descending a tree;

FIG. 32 illustrates a wheel drive for adjusting and positioning the toothed wheels employed with the embodiments shown in FIGS. 24-31;

FIG. 33 is a vertical center section of the tensioning drum employed for holding the toothed wheels and casters into engagement with a tree;

FIG. 34 is a section taken on line 34—34 of FIG. 33;

FIG. 35 is essentially a center section of the drive means and transmission housing for rotating the toothed wheels, and further including an air pump that supplies air pressure for both a control line and means that actuate a chain saw;

FIGS. 36 and 37 illustrate a motor driven chain saw that may be employed with the means for climbing and descending a tree but shown in disassociated relationship, as it might be also employed;

FIGS. 38 and 39 are elevations of the motor driven chain saw as mounted to the preferred embodiment of a means for climbing and descending a tree, the cutting means of said chain saw being disposed in vertical position for delimbing a tree;

FIG. 40 is a top plan view of the apparatus shown in FIG. 38;

FIG. 41 is an enlarged section and elevation showing details of the pinning means for mounting the saw to the tree climbing apparatus, said section being taken on line 41—41 of FIG. 39;

FIG. 42 is an enlarged section and elevation showing details of the means for securing the cutting machine in one of two positions of support, said section being taken on line 42—42 of FIG. 39;

FIGS. 43 and 44 are elevations of the support and drive housing for the chain saw, portions being broken away to show internal parts;

FIG. 45 is a substantially center section taken on line 45—45 of FIG. 43;

FIG. 46 is a section taken on the broken line 46—46 of FIG. 44;

FIG. 47 is an enlarged detail and section of the drive mechanism and drive housing shown in FIGS. 43 and 44;

FIG. 48 illustrates the means for dislodging a severed trunk section of the tree trunk and marking the end of that section for identification;

FIG. 49 is a top plan view of an analog computer having an output shaft linearly proportional to the rate of the machine's climb and descent;

FIG. 50 is a side elevation of the computer shown in FIG. 49;

FIG. 51 is an elevation of a timing device for controlling the operation of the cutting means in response to the vertical descent of the machine;

FIG. 52 is a side view of the apparatus shown in FIG. 51; and

FIG. 53 is a schematic view of various operating parts of the machine including a diagrammatic illustration of a control circuit for operating the machine.

*General description of method and machine's operation*

Referring in particular to FIGS. 1-6, the machine herein described generally comprises means for climbing and descending a tree, indicated by the reference character A, and a motor driven chain saw B. Each of these pieces of apparatus, A and B, is described hereinafter in great detail. As a preliminary matter, however, and as an aid to a thorough understanding of the machine and its capabilities, its method of operation will be briefly described.

Figure 1:
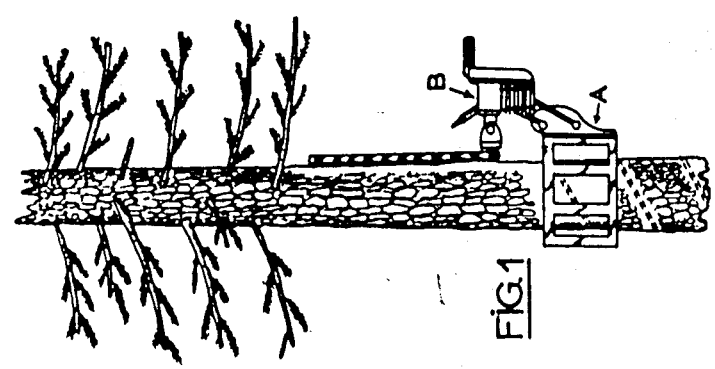

First the machine is mounted to a selected tree by encircling the tree with a flexible connection that forms a part of climbing and descending means. The flexible connection is then wound upon a tensioning drum, placing a plurality of toothed drive wheels and a plurality of caster wheels into contact with the trunk of a tree. The motor driven chain saw may be mounted to the tree climbing means either before or after the tree is encircled with the flexible connection. In any event, the three climbing means A and the motor driven chain saw B are mounted to the tree trunk as shown in FIG. 1. Importantly, the cutting edge of the chain saw is supported in a vertical plane closely adjacent to the surface of the tree trunk.

Once the machine is mounted to the tree as shown in FIG. 1, a control circuit is energized to initiate one cycle of operation, and the machine begins to climb the tree trunk following a spiral pathway. During the ascent all branches of the tree are severed from the trunk, said branches falling to the ground and forming a cushioning bed. Importantly, during the machine's ascent its angle of climb is increased in logarithmic relation to a decrease in the circumference of the tree. In this way a constant vertical height of climb is obtained for each revolution of the machine.

Figure 4:
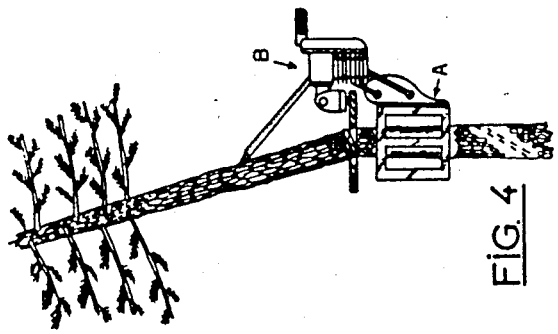
Figure 6:
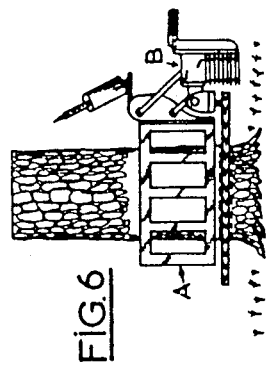
Figure 3:
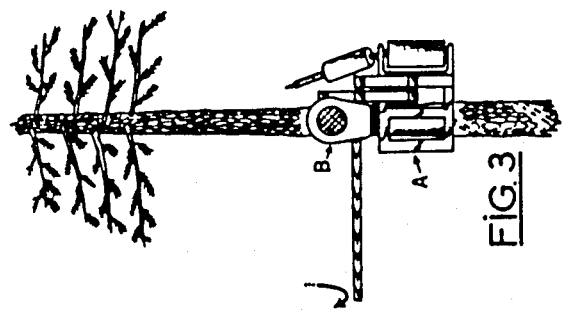
Figure 5:
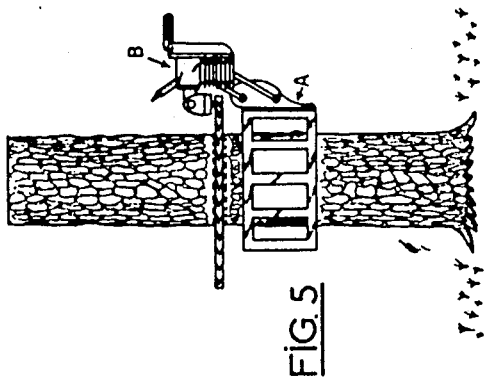
Figure 2:
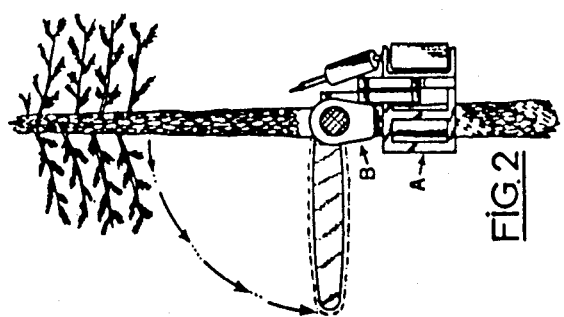
Figure 4A:
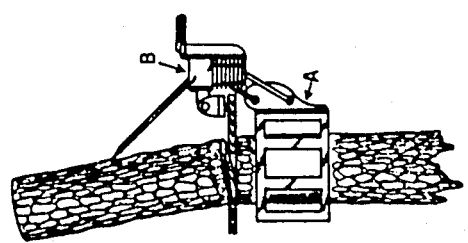

When the machine arrives at a height where the circumference of the tree is of a certain dimension, the machine will stop from further ascent and will maintain a position of repose until a portion of the saw machine completes two pivots on two different axes, placing the cutting edge of the saw in a horizontal cutting plane. This action is shown step-wise in FIGS. 2 and 3; in FIG. 2 the saw blade has been pivoted 90° on a horizontal axis perpendicular to the near surface of the tree; FIG. 3 illustrates the position of the saw machine after its cutting edge has been pivoted on the second pivot axis into a horizontal cutting plane. Once the chain saw has assumed the position illustrated by the solid lines of FIG. 3, the cutting edge is moved into engagement with the tree trunk, severing an upper section from the lower portion. An air cylinder mounted to the machine dislodges each upper severed section from the lower portion, as shown in FIG. 4, and the end of the severed section is sprayed with an identifying color marking. After the saw blade pivots back to its starting position, the machine as a whole descends a predetermined vertical length and another section is cut from the trunk. This operation continues until the machine approaches the base of the tree, as shown in FIG. 5. At this point the machine automatically stops, the chain saw is manually pivoted on its tree climbing support into the position shown in FIG. 6, and the last section or stump is severed with the machine under manual control.

A detailed description of the machine will now be given:

Means for climbing and descending a tree

Referring to FIGS. 7-19, in particular, there is shown a preferred means for climbing and descending a tree. The means for accomplishing this purpose comprises a linkage assembly 10 having a plurality of arcuate links 11, 12, 13 and 14 articulately connected one to another. The arc of each link is preferably such that the curvature of the linkage assembly as a whole conforms with the contour of the trunk of the tree at the intended top position of the machine's climb.

Link 14 is pivotally connected to link 13 by means of a stem pinion 15 having ends that are tight fitting and keyed into apertured ends of link 14. Similarly, links 12 and 13 are pivoted one to another by a stem pinion 16 that is keyed into the apertured ends of link 12. Brackets 17 and 18, pivoted to stem pinions 15 and 16, respectively, support a rack bar 19, holding toothed surfaces of the rack into contact with toothed surfaces of the pinions. As a result of this construction, any pivotal movement of link 14 relative to link 13 produces a movement of rack 19, causing a corresponding pivotal movement between links 12 and 13. Thus, it will be seen that links 12, 13 and 14 (which serve as a base of support for the cutting machine) act as a unitary structure; and because of its length, the base of support for the machine is moved only small amounts when the drive wheels pass over bumps and ridges of the tree's surface.

A pair of arms 20 and 21 are pivoted at one end to link 14, the other end of each arm rotatably supporting a tensioning drum 22. A flexible belt 23 is secured at one end to the surface of drum 22 by a bracket 24 and the other end of belt 23 is disconnectably joined to arcuate link 11 by a connecting means that is to be more particularly described below.

Each of the links 11, 12, 13 and 14 support a pair of vertically spaced toothed drive wheels 25 and 26, link 14 also supporting a second pair of drive wheels near its leading end. Each of the drive wheels 25 and 26 is mounted on a rotatable and pivotal support leg that allows the wheel to be rotatably driven, while also providing means for adjusting its angle of climb. Pivotal movement of the support leg is used to maintain substantial perpendicularity between the axis of leg rotation and the surface of the tree. This perpendicularity is controlled by the circumference of the tree at the height of the machine's climb and is, therefore, constantly subject to adjustment.

Figures 13, 14:
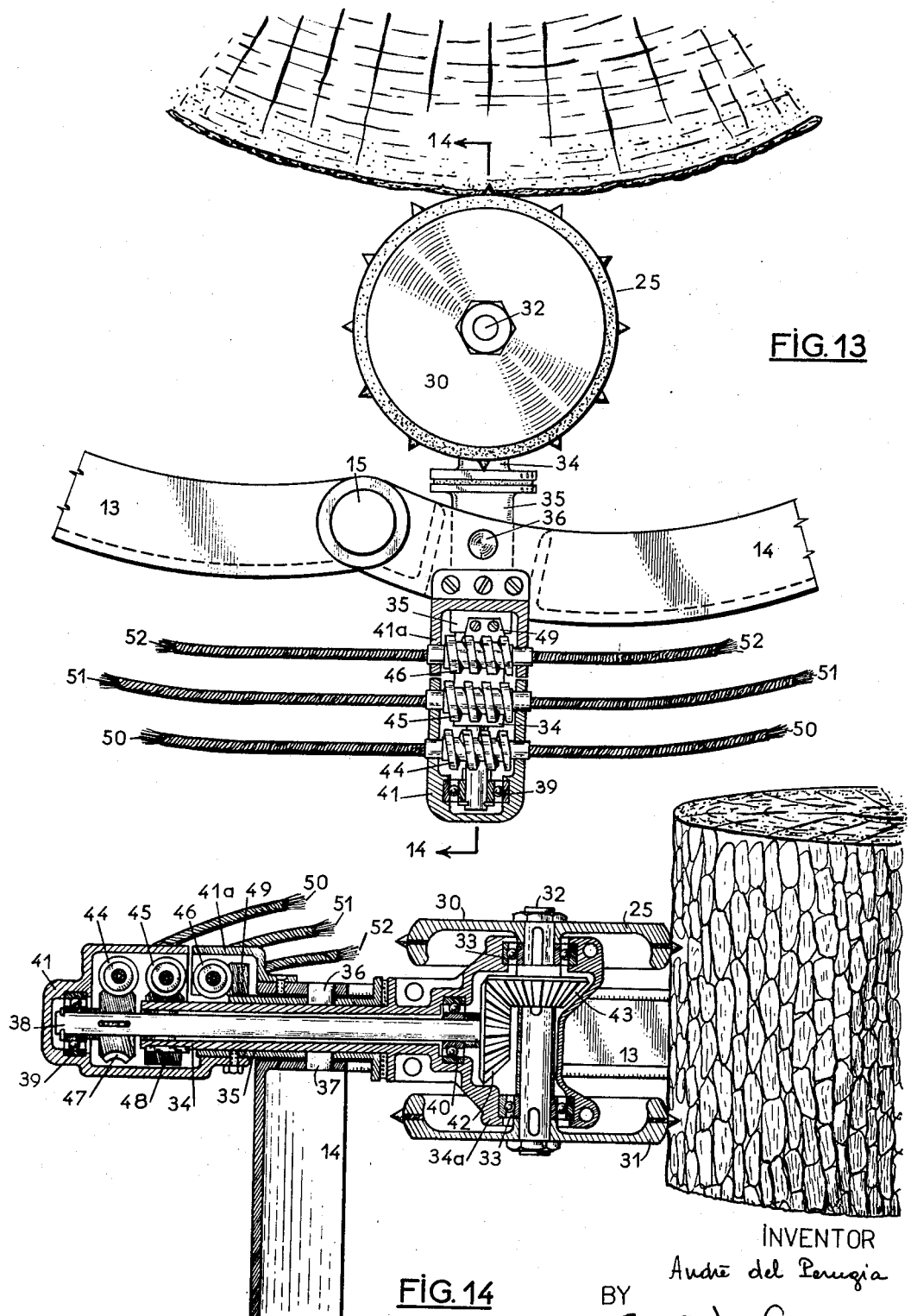
FIG. 13 is a plan view and detail of the toothed wheel and drive means therefore as shown in FIGS. 8 and 10.
FIG. 14 is essentially a center section of the toothed wheel and drive means taken on line 14—14 of FIG. 13.

Referring particularly to FIGS. 13 and 14, each toothed wheel 25 and 26 comprises a pair of toothed disks 30 and 31 keyed to a shaft 32 rotatably supported in a pair of roller bearings 33, said bearings being coaxially mounted in a bell housing 34a formed at one end of a tubular shaft 34. Shaft 34 is received within a sleeve 35 that serves as the main support leg, each sleeve being pivoted on a pair of pins 36 and 37 secured to the links 11-14. A drive shaft 38 extends through tubular shaft 34 and is rotatably supported in a pair of bearings 39 and 40. Bearing 39 is mounted in a gear housing 41 secured to pivoted sleeve 35, and bearing 40 in mounted in a suitable recess of the bell housing 34a. A pair of bevel gears 42 and 43 drivingly connect wheel support shafts 32 with drive shafts 38.

Gear housing 41 supports two spiral gears 44 and 45, gear 44 being meshed with a pinion 47 keyed to drive shaft 38 and gear 45 being meshed with a pinion 48 secured coaxially to tubular shaft 34. A third spiral gear 46 is rotatably mounted on a gear cover 41a attached to each link, and a rack plate 49 is held into surface engagement therewith, each rack plate being attached to the end of pivoted sleeves 35. With reference to FIG. 14 in particular, it will be seen that a rotation of helical gear 44 produces rotation of its associated toothed wheel; rotation of helical gear 45 rotates tubular shaft 34 and its bell housing 34a, thereby providing means for adjusting the horizontal inclination or angle of climb of the toothed wheel it supports; and, rotation of helical gear 46 pivots sleeve 35 and the entire wheel assembly it supports for maintaining perpendicularity of the support axis.

Helical gears 44, 45 and 46 of each wheel assembly are rotatably driven by means of flexible cables, each cable being operated in a manner that will be described in detail. Nevertheless, for purposes of relating the cables that are associated with each toothed wheel, each upper toothed wheel 25 is operated by a set of three cables 50, 51 and 52, and each lower toothed wheel 26 is operated by three cables 50a, 51a and 52a.

Controls for adjusting angle of climb and perpendicularity of wheel support

Figure 15:
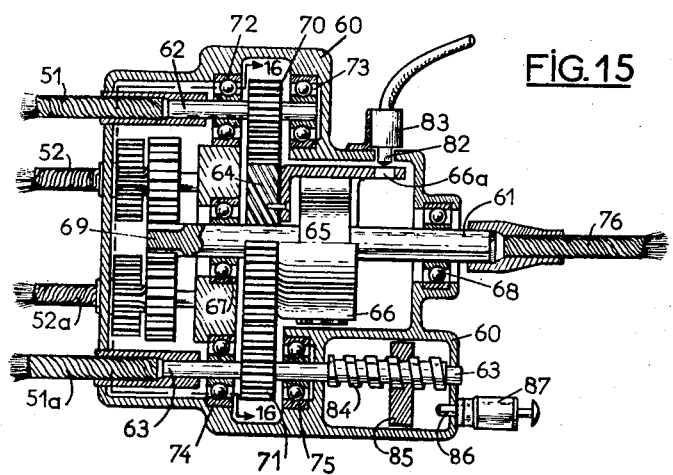
FIG. 15 is a section taken through a gear box that controls the positioning of each toothed wheel with respect to its angle of horizontal incline and the perpendicularity of its supporting leg.
Figure 16:
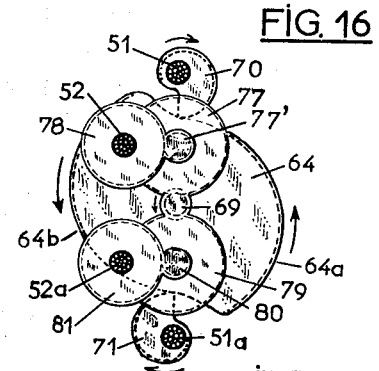
FIG. 16 is a side elevation of the gearing contained in the gear box of FIG. 15 as viewed on line 16—16 thereof.

Referring to FIGS. 15 and 16, there is shown a gear box including a support housing 60 having a rotatable input shaft 61 and a pair of first rotatable output shafts 62 and 63, respectively connected to flexible drive cables 51 and 51a. It will be remembered that cables 51 and 51a operate the worm gears 45 of toothed wheel assemblies 25 and 26, respectively. Shaft 61 supports an elliptical gear 64 that is freely mounted thereon but drivingly connected to shaft 61 by means of a yieldable coiled drive spring 65, the inner end of said spring being connected to shaft 61 and its outer end being connected to a cup retainer 66 secured to elliptical gear 64. Shaft 61 is supported on a pair of bearings 67 and 68, and the inner end of said shaft carries a pinion 69. Elliptical gear 64 has a pair of symmetrical gear surfaces 64a and 64b that respectively engage elliptical pinions 70 and 71. Pinion 70 is mounted on output shaft 62, which is supported in bearings 72 and 73, and pinion 71 is similarly mounted to output shaft 63 that rotates in bearings 74 and 75.

Input shaft 61, it will be noted, is rotatably positioned by a flexible cable 76 which is itself rotatably adjusted by changes in the position of the machine along the trunk of a tree to which it is mounted. More particularly, cable 76 is rotated in response to changes in the tree circumference as the machine climbs and descends the tree, the purpose of which is to effect a change in the angle of climb and maintain a given vertical height of climb for each revolution of the tree made by the machine.

Figures 11, 12:
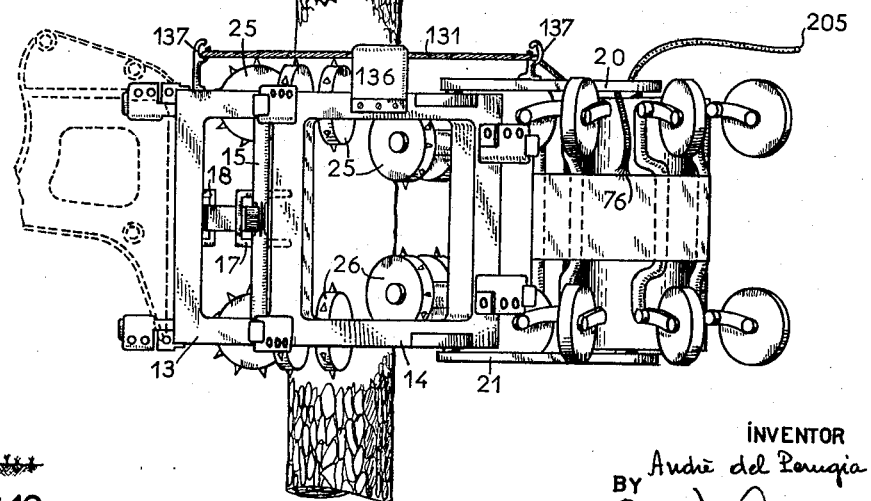
FIG. 11 illustrates the spiral path around a tree trunk that has been climbed and delimbed with a machine having a fixed angle of climb.
FIG. 12 shows the spiral path around a tree trunk that has been climbed and delimbed by an apparatus as herein contemplated, where the angle of climb varies as a function of the circumference of the tree at the point of climb.

FIGS. 11 and 12 illustrate the significance of increasing the angle of climb as the machine ascends a tree. FIG. 11 illustrates a spiral pathway of a machine that has climbed the tree with a constant angle of climb, whereas FIG. 12 illustrates a spiral pathway where the angle of climb increases as a function of decreases in the circumference of the tree. A comparison of the spiral pathways illustrated in FIGS. 11 and 12 will show that fewer revolutions of the tree are required for climbing a given tree to a predetermined height where the angle of climb increases as the machine ascends the tree. Each revolution over the minimum number required to complete delimbing of the tree represents added work time and greater expense than necessary to accomplish the job.

Elliptical gears 64, 70 and 71 are particularly formed to produce an essentially logarithmic spiral of climb for the machine. The exact shape of these gears will depend on various factors but may be readily constructed by persons skilled in the gear cutting art in view of the following considerations:

Machines that are constructed to climb the full length of a tree at a fixed angle of climb will have a fixed rate of climb limited by the length of the cutting bar employed and the largest diameter of trees which are to be cut. If the full length of the cutting bar is utilized for the first revolution of the tree, then successive revolutions of the tree, at vertical elevations where the circumference of the tree is much smaller, will utilize only a small portion of the cutting bar; and ordinarily each revolution of the machine will delimb a narrower strip around the tree trunk than that cut by the preceding revolution. As an example, if a cutting bar were used that had an effective cutting length of 22 inches, and if the machine was to be worked on pine trees having an 18 inch maximum diameter, the machine would climb the tree trunks with a fixed angle of climb of approximately 22°. Assuming that the machine climbs to a point where the diameter of the trunk is 4 inches, the vertical height climbed in the last revolution of the machine would be only 5 inches. Accordingly, 17 inches out of the 22 inches of cutting bar would not have been used during the machine's last revolution. Contrasted with that result the present invention provides a tree climbing means where the angle of climb is determined by the diameter or circumference of the tree at the point of the machine's climb, the full length of the cutting bar being utilized for each revolution of the machine. The path of the machine's climb may be regarded as a logarithmic spiral that will be determined by the effective length of the cutting bar and the maximum diameter of trees that are to be climbed. This spiral may be determined by computing various angles of climb necessary for producing a vertical ascent of the machine equal to the length of the cutting bar, each angle being based on a different tree diameter. The various angles of climb are then plotted graphically with regard to their related tree diameters for which computations are made, and the shape of gears 64, 70 and 71 may be based on the graphic drawing formed by connecting the plotted points with a continuous line.

It is particularly contemplated that elliptical gears 64, 70 and 71 be shaped to rapidly adjust the angle of climb to 90° when the circumference of the tree at the point of climb is of predetermined minimum size. It is believed that a modification of the elliptical gears to produce this effect is well within the skill of persons experienced in the construction of and the special applications for elliptical gearing.

Referring again to FIGS. 15 and 16 pinion 69 mounted to input shaft 61 drives a pair of control cables 52 and 52a for maintaining the supporting axis of each toothed wheel assembly 25 and 26 in perpendicular relationship to the surface of the tree they contact. Fexible cable 52 connects with each of the upper toothed wheel assemblies 25 and flexible cable 52a connects with lower toothed wheel assemblies 26. A driving connection is made between flexible cable 52 and pinion 69 by means of reduction gearing comprising a gear 77 peripherally meshed with pinion 69 and coaxially connected to a pinion 77'. Pinion 77' is itself meshed with a larger gear 78 rotatably supported and connected to the end of flexible cable 52.

The same type of drive connection is provided for rotatably positioning flexible cable 52a. For this purpose a gear 79 is peripherally engaged with pinion 69 on its diametrically opposite side from gear 76. Gear 79 is rotatably supported and coaxially connected to a pinion 80 held in peripheral engagement with a larger gear 81.

The primary significance in maintaining perpendicularity between the support axis of the wheel assemblies 25 and 26 and the contacted surface of the tree is that wheel traction is a function of the force holding the wheel against the tree. Since this holding force, provided by the tensioning drum 22 in the manner to be described, is essentially uniform, the traction of the wheels would vary except for the adjustment provided. Although it is not necessary to maintain perpendicularity between each of the wheel support axes and the surfaces of the tree they engage, the adjustability provided by the wheel mounting and its control is an effective means for preventing slippage and reducing the amount of tensioning force that otherwise might be required of drum 22.

Figure 10:
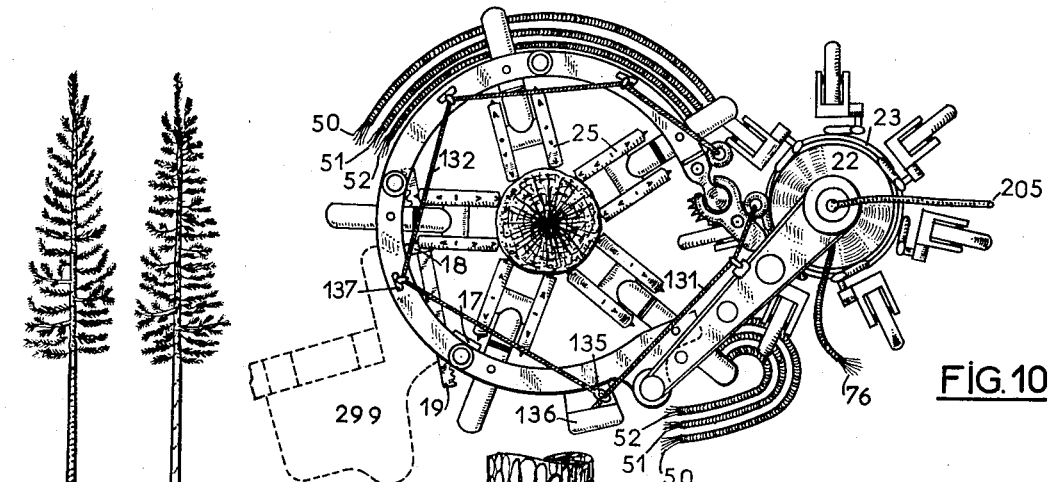
FIG. 10 is a top plan view of the apparatus shown in FIG. 9.

The yieldable connection provided by spring 65 becomes important when the machine attains the maximum height of climb. At the pinnacle of climb, cable 76 will have rotated cables 51 and 51a, through the elliptical gearing, as to position each toothed wheel in a vertical alignment as shown in FIG. 10. In this position, an opening 66a formed in the spring retention cup 66 will be aligned with a detent member 82 of an air operated cylinder 83 that is mounted to the support housing 60. Operation of the air cylinder 83 places its detent 82 into engagement with the openings 66a, thereby locking elliptical gears 64, 70 and 71, output ashafts 62 and 63, and the flexible cables 51 and 51a. Thereafter, the machine descends the tree in a vertical path with wheel assemblies 25 and 26 held in vertical alignment. Nevertheless, since input shaft 61 is controlled by the tree's circumference at the point of descent, flexible connections 52 and 52a are rotatably positioned to maintain perpendicularity between the support axis of the wheels and the contacted tree surface. During the machine's descent spring 65 becomes more closely wound around shaft 61.

Gear box and housing 60 further provides an actuating control for limiting the machine's height of climb. A screw 84, secured to the end of output shaft 83, supports a traveling block 85, and upon rotation of the screw block 85 is moved axially in one direction or the other depending on the direction of screw rotation. The position of the traveling block 85 is initially positioned so that it makes contact with the operator 86 of a valve device 87 when toothed wheel assemblies 25 and 26, whose incline is adjusted by output shaft 63, are aligned in a vertical direction. In operation, block 85 engages operator 86 when the machine reaches a point where the tree circumference is of a predetermined size. It is further contemplated that the length of operator 86 may be made adjustable, or the operator itself replaced with one of shorter or greater length, to produce variations in the control of the machine's climb. The control circuit that includes the valve device 87 is to be later described.

*Flexible connection for embracing tree*

Figure 17:
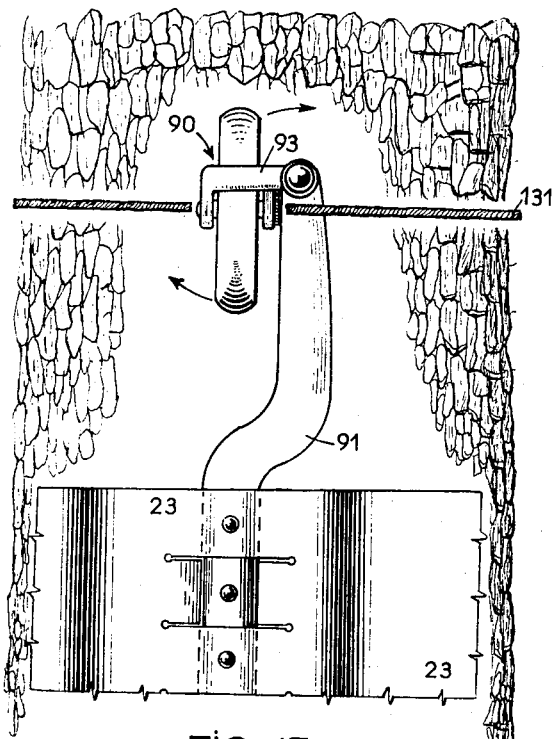
FIG. 17 is an elevation of the caster assembly and the means for mounting it to a flexible belt or connection that encircles the tree.
Figure 18:
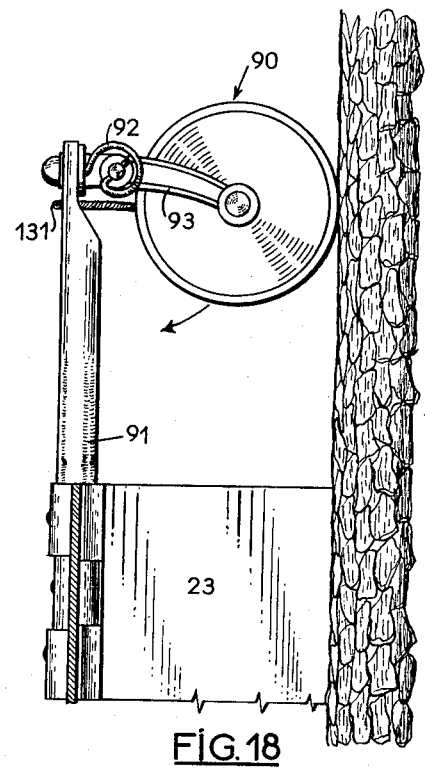
FIG. 18 is a side elevation of the caster assembly shown in FIG. 17.

Flexible connection 23 supports a plurality of caster assemblies 90 in a manner best shown in FIGS. 17 and 18. The caster assemblies are disposed in vertical pairs along the length of the belt for making contact with the surface of a tree. Each caster assembly 90 is supported from a vertical support arm 91 secured to the flexible connection or belt 23 by means of a coiled spring 92. One end of spring 92 is rotatably mounted to arm 91, the other end being secured to the yoke frame 93 that forms a part of each caster assembly. The rotatable connection of spring 92 to arm 91 allows rotation of the caster assembly on an offset axis that is essentially perpendicular to the surface of the tree and, thus, the caster assembly as a whole may pivot upon that axis as indicated by the arrowed lines of FIG. 17. The resiliency of the spring support 92 also allows movement of the caster assembly away from the tree as indicated by the arrowed line of FIG. 18. As a result, the caster assemblies can accommodate and adjust for various irregularities in the shape and contour of the tree.

The means for disconnectably joining flexible connection 23 to the linkage assembly 10 is best shown in FIGS. 19 and 19a, said means comprising an elongate link bar 100 secured to belt 23, an upper hinged connector formed by a pair of members 101 and 102 pivotally joined on a vertical axis and held together by a retainer pin 103, and a connector member 104 pivotally hinged to link 100 on a vertical axis and held thereto by a retainer pin 105. Each of the connector members 101, 102 and 104 has a pair of spaced lugs adapted for receiving and being pinned to an ear. The lugs of member 101 receive an ear 106 formed integrally with link bar 100; the apertured lugs of member 102 receive the ear 107 provided at the top end of link 11; and the lugs of connector member 104 receive the ear 108 provided at the bottom end of link 11. Each of the ears 106, 107 and 108 are pinned to their respective lugs of the connector members by spring operated pinning devices, and each pinning device is operated by an air cylinder 109 mounted to link 11. More particularly, a pin 110 is slideably mounted for releasably pinning ear 106 to the lugs of connector member 101, said pin being resiliently biased upward by a coiled spring 111 disposed between a support arm 112 and an actuating lever 113. Similarly, a rod 114 pins ear 107 to the lugs of link member 102, said rod being pressed upwardly by a spring 115 lodged between a support 116 and an actuating lever 117 which is adapted to be actuated against the resilient bias of the spring 115 by means of the cylinder 109. For this purpose one end of plate 117 is vertically aligned beneath a shear pin 118 threadedly attached to the piston rod 119 of cylinder 109. Inasmuch as actuating plate 113 is vertically aligned beneath plate 117, an actuation of the latter plate will also move plate 113 against its spring 111. Accordingly, when pin 110 and rod 114 are moved downwardly they effect a disconnection between ears 106 and 107 and the respective lugs of connector members 101 and 102. It will be further noted that rod 114 is formed with an offset lower end that allows the same rod member to be used for pinning ear 108 to the lugs of connector link member 104. Therefore, a downward movement of rod 114 also disconnects link member 104 and link 11. After a complete disconnection has been effected, there will be a transverse strain applied to pin 118, causing it to shear and permitting plate 117 to move away with the assembly mounted to link members 101 and 102.

Referring to FIG. 19b, air cylinder 109 has a main piston 120 connected to the lower end of piston rod 119, and air pressure is applied to the top side of the piston through a pressure line 121. Although the applied air pressure tends to force the piston and piston rod downward, to effect a release of the pinning mechanism holding link members 102 and 104 to link 11 and link 101 to link 100, piston rod 119 is held in a raised position by a latching dog 122 that is actuated by a spring 123 and an air cylinder 124 having a pressure feed line 125. Under normal operating conditions spring 123 holds dog 122 into transverse engagement with a notch formed on rod 119. But when suitable fluid pressure is applied to air cylinder 124 the spring is compressed and the latching dog is disengaged from the slot, allowing piston 120 and rod 119 to be moved downward. The application of fluid pressure will be described later in connection with the overall control and operating circuitry for the machine.

*Safety cable*

Figure 9:
FIG. 9 is an elevation illustrating the tree climbing means of FIGS. 8 and 9 but positioned on a tree trunk of smaller diameter.
Figure 9A:
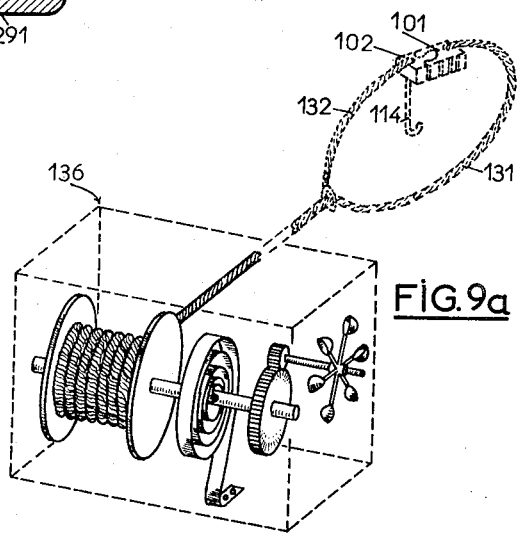
FIG. 9a is a perspective view of the working parts of a safety reel used for lowering the apparatus under emergency conditions.

Referring to FIGS. 7-10 and FIG. 19, a flexible cable 130 encircles the tree that is being climbed, said cable serving as a safety device in the event that the machine fails to operate or loses power while at an elevated position on the tree. The safety cable 130 is formed in two sections, 131 and 132. One end of section 131 connects with an eye 133 attached to link member 101, and one end of section 132 connects to an eye 134 mounted on link member 102. The other end of section 132 is provided with a loop 135, shown in FIGS. 8 and 10, said loop receiving rope section 131 therethrough. The other end of rope section 131 is anchored to a reeling device 136 of conventional design and having a spring wound drum controlled by a windmill drag that allows rope section 131 to be paid out at a controlled rate. A reeling device of the type contemplated is shown in FIG. 9a. Under conditions, such as a power failure, flexible connection 23 will have been uncoupled from link 11 by operation of the cylinder 109, and rope sections 131 and 132 serve as means for supporting the machine while allowing it to slowly gravitate toward the ground.

Figure 7:
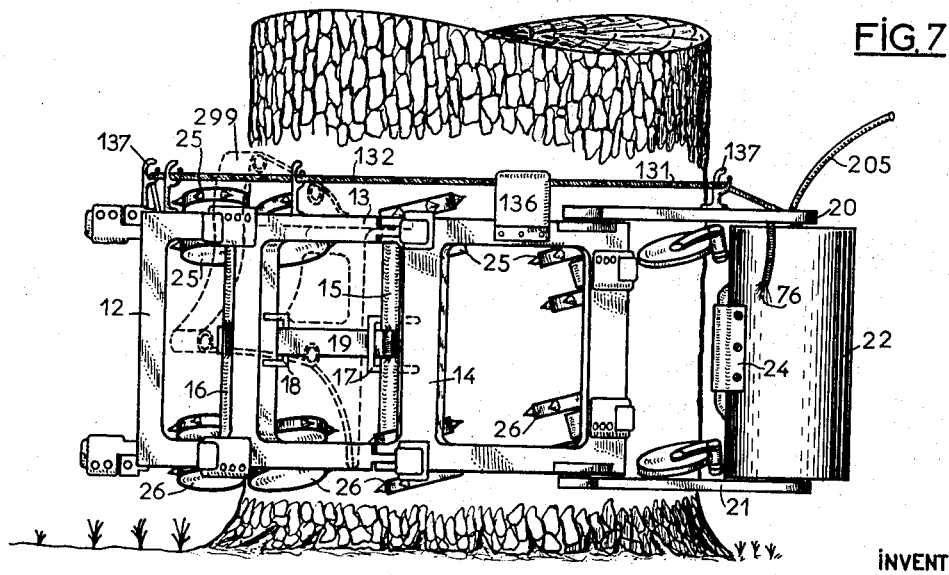
FIG. 7 is an elevation view of a preferred embodiment of a portion of the machine and more especially showing a preferred means for climbing and descending a tree.

A plurality of cable guides 137 mounted to links 11, 12 and 13 receive rope section 132 therethrough. Another rope guide 137, mounted to drum supporting arm 20, receives rope section 131 as shown in FIGS. 7 and 9.

*Other embodiments of means for embracing a tree trunk*

A second embodiment of a tree embracing means for climbing and descending a tree is shown in FIGS. 20-23. The structure shown in these figures comprises a rectangular support frame 140 and an extensible scissors-link belt arrangement 141 made from a plurality of flat bars 142 cross-connected for pivotal movement by pins 143 and pivotally joined at their upper and lower ends to other bars 142 by pins 144. A plurality of swivel casters 145, which may be identical to casters 90 previously described, are mounted on pins 144. The arrangement 141 of pivotally connected bars is generally known in the art of mechanical connections, and its operation is such that by moving any two ends of two pivotally connected bars the entire scissors arrangement may be selectively expanded or contracted.

Referring to FIG. 21, the lower ends of two bars 142 are connected to support frame 140 by means of pins 146, and bars which cross those are pin-connected at their upper ends to a transverse cross member 147, said cross member being mounted on the upper end of a piston rod for an air operated cylinder 148. Operation of the air cylinder will, therefore, produce an expansion or contraction of the expandable linkage assembly.

A pair of toothed drive wheels 149, substantially identical to those previously described, are also provided. One toothed drive wheel is mounted to support frame 140 near its lower end, and a second toothed drive wheel is pivotally mounted to cross member 147.

It will be apparent that the embodiment of FIGS. 20-23 do not employ a tensioning drum as with the preferred embodiment previously described. However, the same pressurized fluid which is used to apply a torque to the tensioning drum 22 (in a manner yet to be described) may also be used to operate the air cylinder 148. The application of air pressure to the cylinder 148 will push up its piston rod, raising cross member 147 and moving the ends of the bars pinned thereto upward relative to the lower ends of the bars pinned to support frame 140. As a consequence, the linkage assembly 141 will be contracted and the casters 145 placed into engagement with the surface of the tree. Since movements of toothed wheels 149 are always toward or away from the center of the linkage arrangement, no means need be provided for maintaining perpendicularity in the support leg of the toothed wheels. Thus, the control provided by cables 52 and 52a in connection with the embodiment shown in FIGS. 7-10 is not utilized.

Referring to FIGS. 24–27 there is shown a second alternate embodiment of a means for embracing and climbing a tree. The means shown generally comprises a support frame 150 and a flexible connection 151. One end of flexible connection 151 is provided with hooks 152 that may be selectively engaged or disconnected from ears 153 provided on support 150. A plurality of caster assemblies 154 are mounted to connection 151 and one end thereof is secured to a tensioning drum 155, said drum being rotatably mounted on a pair of arms 156 and 157 extending outward from support 150. The construction and operation of drum 155 is the same as drum 22, which is to be later described in detail.

A pair of threaded bars 158 and 159, each mounted to support frame 150, are journaled at their ends and drivingly connected to a pair of flexible cables 160 and 161. Both bars 158 and 159 are machined to provide right and left hand screw threads, and upon these threads are mounted four traveling blocks 162. The blocks on one bar are interconnected to blocks on the other by vertical members 163, and each traveling block supports a toothed drive wheel assembly 164 constructed in the manner shown in FIG. 32, in view of which it will be apparent that each toothed wheel is rotatably driven and capable of being angularly adjusted, the same as toothed wheel assemblies 25 and 26 shown in FIGS. 13 and 14.

In general, the assembly of FIG. 32 comprises a single toothed wheel 165 secured to one end of a rotatably mounted shaft 166, said shaft being rotatably supported upon a tubular leg or housing 167. Shaft 166 is rotated through a drive connection comprising a pair of bevel gears 168 and 169, gear 168 being mounted to the end of shaft 166 and gear 169 being supported on the end of a main drive shaft 170. A pinion 171, secured to the opposite end of shaft 170, is peripherally engaged by a worm 172 that is rotatably mounted from a housing 173 secured to traveling block 162. Tubular leg 167 is itself mounted for rotation in a bearing provided on housing 173, and the leg is pivotally positioned by a gear drive comprising a pinion 174 and a worm 175.

Flexible cables 176 and 177 are employed for rotating worms 172 and 175, respectively, thereby driving and angularly positioning wheel 165. The cable connection for driving worm 172 corresponds with cable 50 previously described; and the cable connection for turning worm 175 corresponds with cable 51, thereby adjusting the wheel's angle of climb in accordance with the circumference of a tree at the point of the machine's climb.

The movement of traveling blocks 162 along the threaded surfaces of bars 158 and 159 is a function of the circumference of the tree at the elevation of the machine's climb and descent. In view of FIGS. 25 and 26 it will be evident that as the circumference of the tree becomes less the pair of traveling blocks 162 on each threaded bar move toward one another. This result is produced by connecting cables 160 and 161 to the output shafts of a reduction gear box having an input shaft rotatably positioned in response to the circumference of a tree. It is contemplated that a gear box of the type shown in FIG. 15 could be used for this purpose, cables 160 and 161 being connected to the gear box in lieu of cables 52 and 52a.

FIGS. 28–31 of the drawings illustrate a fourth embodiment of means for embracing and climing a tree. This embodiment comprises a support frame 180 and a flexible connection 181 having one of its ends releasably connected to ears 182 attached to frame 180 by hooks 183. The flexible connection 181 supports a plurality of casters 184, and the connection is adapted to be wound on a tensioning drum 185, in the same manner as described for the embodiment of FIGS. 24–27. A pair of wheel supporting arms 186 and 187 are pivotally mounted to frame 180, the pivot support of arm 186 being connected to a flexible cable 188. The pivotal movement of arm 186 is transmitted to arm 187 by means of a drive chain 189 that encircles a pair of pinions 190 and 191 secured to the pivot supports for arms 186 and 187, respectively. The ends of pivoted arms 186 and 187 support toothed drive wheels 192, each wheel being rotatably driven and capable of having its angle of climb adjusted in the manner described in connection with the embodiment of FIGS. 24–27 and FIG. 32.

The operation of flexible cable 188 is controlled by a gear box like that shown in FIG. 15 having a rotated input shaft that is positioned depending on the circumference of the tree at the point of climb. Cables 188 would be connected to an output shaft in the same manner as cable 52 previously described.

Pivotal movement of arms 186 and 187 through operation of cable 188 maintains substantial perpendicularity between the supportnig axis of the wheel assemblies 192 and the surface of the tree that the wheels engage. In addition, the pivotal supporting arrangement of arms 186 and 187 provides a greater base of support in a vertical direction when the machine is at the top of the tree, thereby improving its stability.

*Tensioning drum*

A cross sectional view of tensioning drum 22 is shown in FIG. 33, said drum comprising a cylindrical housing 200 supported from arms 20 and 21 by a pair of ball bearings 201 and 202. Bearing 201 is coaxially mounted on a spindle 203 connected at its upper end to arm 20. Spindle 203 defines an air passage 204 opening at its lower end into housing 200, the upper end of the air passage 204 being adapted for fluid communication with a pressure source by means of a flexible hose 205. A support arm 206 is formed integrally at the end of spindle 203, said arm being bifurcated at each of its ends for rotatably receiving a pair of spindles 207 and 208. Helical gears 209 and 210 are mounted to spindles 207 and 208, respectively, each helical gear being keyed to the spindle upon which it is mounted and peripherally engaged with a ring gear 211 coaxially secured to a collar 212 formed integrally on a cover plate 213 of drum 22. Cover plate 213 is also formed with an upper collar 214 to which there is mounted a ring gear 215 peripherally engaged with a worm 216 that is rotatably mounted on the arm 20 (by means not shown) and drivingly connected to one end of flexible shaft 76, previously described.

A movable diaphragm or piston assembly is disposed within housing 200, said assembly comprising a piston 218 having O-ring seals 219 peripherally engaged with the interior surface of housing 200. Piston 218 is mounted to a flanged stem 220 rotatably supported by a bearing 221 on a plate 222 that is itself supported by a pair of flexible bands 223 secured at their ends to spindles 207 and 208, respectively. The bottom end of housing 200 is closed except for openings 224 and 225 that allow air to be drawn in and expelled from the interior on the bottom side of piston 218.

The position of piston 218 as shown in FIG. 33 is that which it occupies when flexible connection 23 is fully wound around drum 22. Air pressure applied to the interior of housing 200 is introduced through flexible hose 205 and air passage 204, thereby holding or forcing piston 218 downward. When flexible connection 23 is stripped from drum 22, housing 200 rotates upon its bearings 201 and 202, and ring gear 211 turns helical gears 209 and 210, thereby winding up flexible bands 223 upon spindles 207 and 208, and elevating piston 218. A uniform and continuing application of air pressure within housing 200 will, of course, apply a constant torque to the tensioning drum 22 tending to "reel up" flexible connection 23.

It will be further evident that any rotation of drum 22 produces a corresponding rotation of flexible cable 76 through gear 215 and worm 216; and it will be remembered that cable 76 operates the input shaft 61 of the gear box that operates flexible cables 51, 51a, 52 and 52a.

Parenthetically, drum 22 is employed for maintaining tension on flexible connection 23, and the tension applied will depend on the air pressure within housing 200. It follows therefore, that when piston 218 rises in the housing 200, either by manually stripping the flexible connection 23 from drum 22 or in the event that the increasing circumference of the tree requires a greater length of the flexible connection, some air within the sealed chamber must be exhausted through air passage 204. It is contemplated that the air pressure supply connected to passage 204 by means of hose 205 will permit bleeding of the air chamber when the pressure therein exceeds a predetermined level as to maintain a substantially uniform tension on flexible connection 23.

Drive mechanism for tree climbing and descending means

Referring particularly to FIG. 35, there is shown a housing 230 that also provides a support for means that drivingly connect a flexible power supply cable 231 to flexible cables 50 and 50a, said cables having been previously described in connection with operation of toothed wheels 25 and 26. Cable 231 is driven by a gas operated engine through a gear box forming a part of the motor driven chain saw which is described further on in this description. Housing 230 also supports an air pump assembly comprising a housing 232 mounted to housing 230 and having a piston 233 reciprocally operated by the power supply cable 231. The air pump assembly transmits pressurized air to a reservoir tank by means of a flexible hose connection 234.

Cable 231 is connected to a drive shaft 235 by means of a coupling 236, shaft 235 being rotatably supported from housing 230 between a pair of bearings 237 and 238. A bevel gear 239 keyed to shaft 235 drives a pair of clutch housings 240 and 241 by means of bevel gears 242 and 243. Each of the clutch housings 240 and 241 are independently mounted from housing 230 upon separate roller bearings, housing 240 being supported upon bearings 244 and 245 and housing 241 being supported upon bearings 246 and 247. A shaft 249 rotatably mounted in bearings 250 and 251 extends coaxially through both housings 240 and 241, a pair of clutch plates 252 and 253 being supported upon and keyed to the shaft. Clutch plate 252 is adapted to be driven by a complementary clutch plate 254 forming a part of clutch housnig 240, while clutch plate 253 is similarly adapted to be driven by a clutch plate 255 forming a part of clutch housing 241. The spacing between clutching plates and their arrangement allows either one but not both of the clutching plates 252 and 253 to be moved into engagement with their complementary clutching plates, and both clutch plates 252 and 253 may be simultaneously positioned in spaced relation to the clutch plates 254 and 255 that may be used to drive them. The clutching or non-clutching condition of each pair of complementary clutching plates depends on the axial position of shaft 249, which is controlled by the application of air pressure to one side or the other of a piston 256, said piston being mounted to one end of shaft 249 with a ball bearing 257 disposed therebetween. Piston 256 is disposed within a chamber 258 provided in housing 230, and helical springs 259 disposed within chamber 258 on both sides of piston 256 bias the piston and shaft 249 into a "non-clutching" or neutral position. Pressurized air is supplied to one side or the other of piston 256 by means of flexible hose connections 260 and 261 to operate the shaft and its supported clutching plates 252 and 253. It will be apparent in view of FIG. 35 that an application of pressure on one or the other side of piston 256 will bring one or the other of clutch plates 252 and 253 into engagement with the associated clutch plates 254 and 255, respectively.

Shaft 249 is adapted for driving a shaft 262 through a slip clutch comprising a pair of plates 263 and 264 that are held into surface engagement by a spring 265. Clutch plate 264 is mounted in a bearing 266, and the hub portion of said plate is keyed to the end of shaft 249 with a slidable fit.

Shaft 262 is rotatably mounted on a bearing 267 and a pinion 268 keyed to shaft 262 is meshed with a pair of pinions 269 and 270. Pinion 269 drives a cable sleeve 271 rotatably mounted in bearings 272 and 273 while pinion 270 drives a cable sleeve 274 mounted in bearings 275 and 276. Cables 50 and 50a are connected to sleeves 271 and 274, respectively.

It will be apparent that the power of cable 231 is transmitted to cables 50 and 50a when either of the clutch plates 252 or 253 is placed into contact with their associated clutching plates 254 and 255. Of course, engaging plate 252 with clutch plate 254 drives shaft 249 in one direction while engaging clutch plate 253 with clutch plate 255 rotates shaft 249 in the opposite direction. The direction in which shaft 249 is rotated will in turn determine the direction of rotation for cables 50 and 50a and the toothed wheels 25 and 26. In the event that one or more of the toothed wheels cannot be turned, the slip clutch prevents damage to the bevel gearing and allows piston 233 of the air pump to be operated.

Piston 233 is mounted on a connecting rod 277 having a collar 278 engaged with a circular cam 279 that is eccentrically mounted on a shaft 280 supported for rotation in bearings 281 and 282. Shaft 280 supports a gear 283 that is meshed with a pinion 284 keyed to main drive shaft 235.

Motor driven chain saw

Referring to FIGS. 36–47, there is illustrated a preferred embodiment of a motor driven chain saw B comprising a gasoline engine 290, a support and drive housing having a second section 291 pivotally connected to a first section 292, and an elongated saw frame 293 pivotally mounted on section 291. A pair of handles 294 and 295 are mounted to the housing of engine 290 for transporting and using the chain saw separately from the tree climbing and descending means. Handle 294 is bolted to the housing while handle 295 is adjustably slidable in a slotted bracket 296, also bolted to the housing of engine 290. FIG. 36 shows handle 295 positioned at one end of bracket 296 as to project outwardly from the housing of engine 290, thereby providing means for manually supporting and using the chain saw independently of the tree climbing apparatus. Referring to FIG. 38, handle 295 is positioned at the opposite end of bracket 296 while the same is being used with the tree climbing means and, more particularly, while the stump of a tree is being cut close to the ground. At this time handle 295 generally overlies bracket 296 as to provide suitable clearance between the handle and the ground.

Chain saw B is adapted to be mounted to the tree climbing and descending means from a table 299, bolted or otherwise mounted to the linkage assembly, by means of a bracket 300 and a parallelogram linkage comprising a pair of arms 301 and 302. One end of each arm is pinned to bracket 300, arm 301 being pivotally mounted on a pin 303 and arm 302 being mounted on a pin 304; the opposite ends of arms 301 and 302 are secured to pin members 305 and 306, respectively, and pin members are provided on brackets that may be selectively mounted or removed from engine 290.

Referring to FIG. 41, pin 305 is formed integrally with a bracket 307, said bracket being slidably connected to a rail 308 provided on the side of the engine housing. Pin 306 is similarly formed with a lower bracket 309 that is slidably connected to a rail 310. This construction allows the cutting machine to be used by itself, disassociated from the tree climbing means. However, a pair of removable pins 311 are utilized for securing each rail to its supporting bracket as to prevent slidable movement and disconnection while the cutting machine is being used with the tree climbing apparatus.

The cutting machine may be supported in either one of two positions by a pin member 312. Under normal operating conditions the machine is supported in the solid line position shown in FIGS. 38 and 39, pin 312 being mounted in a boss 313 of bracket 300 and having a projected end engaged in complementary openings formed in bracket 309 and rail 310. When the cutting machine is to be used for severing the stump of a tree, pin member 312 is retracted and withdrawn from boss 313, thereby allowing arms 301 and 302 to pivot on the axes of pins 303, 304, 305 and 306. Then, with the machine positioned in the broken line position shown in FIGS. 38 and 39, pin 312 is inserted into a boss 314 of bracket 300, the end of pin 312 being engaged with aligned openings formed in upper bracket 307 and rail 308. A spring pressed ball 315 mounted on pin 312 as shown in FIG. 42, is provided for retaining the pin in one of the machine supporting positions. Ball 315 engages a recess formed on the inside surface of bosses 313 and 314 when the pin has been fully inserted.

As shown in FIGS. 43–45, section 292 of the chain saw housing is rigidly mounted to engine 290 by means of bolts. A main drive shaft 330, supported from section 292 and having a bevel gear 331 mounted to its end, transmits rotation to a second bevel gear 332 supported on the pivot axis connecting housing section 291 and section 292. For this purpose bevel gear 332 is mounted on a shaft 333 supported in a bearing of a pivot sleeve 334, said sleeve being itself received in the collar 335 of section 291. A connector member 336 connects shaft 333 to cable 231 which, it will be recalled, supplies power for operating an air pump and driving the toothed wheels 25 and 26.

A bevel gear 337, mounted for rotation on a shaft 338, is peripherally meshed with gear 332 on an axis perpendicular to the pivot axis between housing sections 291 and 292. Shaft 338 also supports and drives an expandable shoe 339 that forms one part of a conventional type centrifugal clutch. This clutch also comprises retainer springs 340, a driving core 341 and a driven bell housing 342 that is rotatably supported on an internal flange of housing section 291. Rotation of bell housing 342 is adapted to be transmitted to a shaft 344 by means of a clutching device comprised of a pair of jaw sleeves 345 and 346. Jaw sleeve 345 is formed integrally with bell housing 342 while sleeve 346 is keyed to shaft 344, although slidable thereon. A spring member 347 biases sleeve 346 into clutching engagement with sleeve 345, but sleeve 346 may be moved against the spring bias and out of clutching engagement by actuation of a finger 348 that is peripherally engaged with a continuous groove 349, formed circumferentially and coaxially of sleeve 346. Shaft 344 supports a chain sprocket 350 that is operably driven during such time that clutching sleeves 345 and 346 are engaged, providing also that the rotational speed of shaft 338 is sufficiently great to move the expandable shoe 339 into driving engagement with bell housing 342.

A gear 351 that is keyed to the hub portion of bell housing 342 is utilized for driving a gear 352 through reduction gearing and a clutching device, gear 352 being mounted coaxially relative to shaft 344. More particularly, and with reference to FIG. 47, a driving connection is established between gears 351 and 352 by means of gears 353, 354, 355, 356 and 357, a clutching device comprised of sleeves 358 and 359, and gears 360 and 361. Clutching sleeve 58 is formed with a continuous peripheral groove 362 that receives a pin follower mounted at one end of a pivoted lever 363, said lever being supported from housing section 291 on a pin 364. Lever 363 pivotally connects to a rod 365 which is operated by an air cylinder 366.

Gear 352 is keyed to a sleeve 370 having a circular cam 371 formed integrally therewith and mounted eccentrically relative to its rotational axis. Sleeve 370 loosely receives drive shaft 344 therethrough and both shaft 344 and sleeve 370 are supported on a bearing sleeve 372 that is pivotally mounted on housing 391. Bearing 372 supports a generally rectangular vane 373 mounted at one end of a radial arm 374. Vane 373 moves in an arcuate chamber 375 formed by housing 291 and generated by pivoting vane 373 on the axis of shaft 344. This chamber, shown in FIG. 44, allows vane 373 to be pivoted through an angle of approximately 180°. Pivotal movement of vane 373 rotates bearing sleeve 372 and produces a corresponding pivotal motion of an integrally formed arm 376. Arm 376 supports guideblock 377 pivotally mounted on an offset end portion 378 having pivot axes parallel to the axis of shaft 344. Guideblock 377 is received in the rectangular slot 379 of elongated saw frame 293.

A support arm 380 having a circular collar peripherally engaged with circular cam 371 supports frame 293 in a plane common with drive sprocket 350 and guideblock 377. This relationship is best shown in FIG. 45. A blind hole 381 formed in arm 380 allows the arm to be engaged by pin member 365 and locked in a pre-selected position while the chain saw is used to delimb a tree. During this operation, the saw frame is oriented in a vertical cutting plane, indicated by the broken lines of FIG. 43 and the solid lines of FIG. 44.

A conventional saw chain 382 encircles saw frame 293 and the chain sprocket 350.

The above described mounting construction provides means for driving the chain 382 while simultaneously permitting saw frame 293 to be selectively pivoted through an angle of approximately 180°. In addition, saw frame 293 will be rocked upon the pivot support provided by the offset end 378 except during such time that pin 365 is placed into engagement with blind hole 381 of support arm 380. It will be noted that an engagement of pin 365 with blind hole 381 disengages clutching sleeve 358 from sleeve 359. The normal rocking movement of frame 293, however, produces a "working" of the saw independently of manual effort.

A pair of fluid pressure lines 383 and 384 are utilized for selectively applying fluid pressure on one or the other side of vane 373, thereby pivoting saw frame 293 on the axis of shaft 344. A pair of control devices 385 and 386 are mounted to housing section 291 on opposite ends of chamber 375 as shown in FIG. 44. Each control device has an operator 387 and 388, respectively, which is adapted to be engaged by vane 373 when the vane nears the end of chamber 375. The purpose, construction and operation of control devices 385 and 386 will be later described in connection with the overall control and operation of the machine.

Housing section 291 is adapted to be pivoted through an angle of 90° on the axis of sleeve 334 and trunnion 335 by means of an arcuate fluid chamber device comprised of a housing 390, a support shaft 391 and a vane member 392. Housing 390 is provided as an integral portion of housing section 291 and is mounted to support member 391 which is an integral part of housing section 292. Vane 392 extends radially outward from support shaft 391, and housing 390 pivots around the vane in response to the application of air pressure transmitted on one side of the vane or the other. A pair of fluid passages 393 and 394 formed in support member 391 transmit the pressure of an air pressure supply through a pair of supply lines 395 and 396. When pressurized air is applied to housing 390 through line 395, housing section 291 is pivoted relative to housing section 292 into the position shown by the solid lines of FIG. 43. Under other conditions of operation, when fluid pressure is applied to housing 390 through line 396, housing section 291 is pivoted into the broken line position shown.

It will be noted that as housing 291 assumes the broken line position of FIG. 43, the outer surface of housing 390 engages an operator 397 of a switching device 398 mounted by a bracket 399 that is bolted to a head flange formed on housing section 292. The purpose, construction and operation of control switch 398 will be described later in connection with the control circuit and the overall operation of the machine.

*Means for dislodging severed portions of tree trunk and marking*

FIG. 48 of the drawings illustrates the means by which a severed upper portion of the tree trunk is dislodged and simultaneously marked for identification. In particular, an air operated cylinder 400 is mounted to table 299 and the cylinder is canted in a direction toward the trunk of the tree. Upon operation of the air cylinder a rod member 401 engages the upper severed section causing it to be dislodged. When the rod 401 nears the end of its travel in a direction outward of cylinder 400, the end of the severed section is sprayed by means of an air operated sprayer 402, also supported on table 299. The operation of sprayer 402 is controlled by a valve 403 that transmits air pressure from a source of supply through lines 404 and 405 when its valve operator 406 is contacted by the cylinder's piston at the end of its upward travel. Air cylinder 400 is otherwise of a conventional type having a self-contained return spring and a pressure supply line 407.

*Means for controlling length of trunk sections*

FIGS. 49–52 illustrate that portion of the control apparatus that governs the length of tree trunk sections that are severed and insures substantial uniformity in their lengths. This control apparatus also limits the height to which the machine climbs and initiates periodic cycling for severing the tree trunk into sections as the machine descends the tree.

The apparatus shown in FIGS. 49 and 50 is a type of analog computer comprised of a ball member 410 secured to a shaft 411 that is rotatably mounted in a generally rectangular framework comprised of parallel members 412 and 413 and parallel members 414 and 415. Shaft 411 is connected to and rotatably driven by either flexible cable 50 or 50a which also drives toothed wheels 25 and 26. Cable 50 or 50a is connected to shaft 411 by means of a conventional connector 417.

A pair of wheels 418 and 419 are mounted to a second framework comprising members 420, 421, 422 and 423. Members 421 and 423 are rotatably mounted between members 412 and 413 of the first described framework by means of pins 424 and 425, member 421 being tightly connected or keyed to pin 424. Cable 51 or 51a, which adjust the angular incline of wheels 25 and 26, is connected to pin 424 by a sleeve connector 426. Wheels 418 and 419 drive a flexible cable 427 as a function of their position on the surface of ball member 410 and also as a function of the rotation of ball 410.

The shape of ball 410 is such that any rotation of cable 427 is a linear function of the vertical distance the machine climbs or descends. The position of wheels 418 and 419, as shown in FIGS. 49 and 50, is that which they occupy when toothed wheels 25 and 26 are vertically inclined, and under such conditions the ratio between the rotation of flexible cable 427 and cable 50 is a maximum. It will be equally apparent that changing the angle of incline of toothed wheels 25 and 26 will position wheels 418 and 419 closer to shaft 411 of the computer, thereby lowering the drive ratio between the output cable 427 and the input cable 50. Thus, the angular orientation of the framework which supports wheels 418 and 419 serves as a control for yielding an output that is linearly proportional to the vertical distance climbed by the machine.

Flexible shaft 427 drives the timer device shown in FIGS. 51 and 52, said timer device comprising three cylindrical drums 430, 431 and 432. Each drum is coaxially mounted on a support rod 433 mounted between its ends on legs of a frame 434. Bevel gears 435, 436 and 437 are press fitted onto the ends of drums 430, 431 and 432, respectively, and each bevel gear may be separately rotated by engaging it with a bevel gear 438 by slidably positioning gear 438 along support shaft 439 and pinning it thereto. Shaft 439 is rotatably supported in a pair of sliding blocks 440 and 441, and a pair of springs 442 and 443 urge blocks 440 and 441, respectively, in a direction parallel with the rotational axis of drums 430, 431 and 432, placing gear 438 into surface engagement with one of the gears 435, 436 or 437. Moving shaft 439 and blocks 440 and 441 against the bias imposed by springs 442 and 443 allows bevel gear 438 to be moved along shaft 439 (after removal of its pinning to the shaft). As shown by broken lines, gear 438 may then be positioned for engagement with one of the other bevel gears mounted to the drums and then re-pinned to the shaft.

Shaft 439 is rotated through a manually releasable clutch 444 having a slidable jaw sleeve mounted to one end of flexible cable 427. A knurled collar 445 is coaxially mounted to that portion of the clutch connected to shaft 439, and after disengaging clutch 444, shaft 439 may be manually rotated free from cable 427 using collar 445. This manual rotation of shaft 439 is employed for setting one of the drums 430, 431 and 432 before each operation of the machine.

Each drum 430, 431 and 432 is formed with three or more camming surfaces or rings, the rings on one drum having one or more cam lobes, and those cams having more than one lobe are formed with lobes that are spaced a predetermined equal distance apart. The illustrated embodiment of camming surfaces utilizes three continuous rings 450, 451 and 452 on drum 430; four camming rings 453, 454, 455 and 456 on drum 431; and four rings 457, 458, 459 and 460 on drum 432. Cam rings 450, 453 and 457 are each formed with eight cam lobes; cam rings 451, 454 and 458 have four cam lobes each; cam rings 452, 455 and 459 have two cam lobes; and rings 456 and 460 have one cam lobe. The selected arrangement of cam rings and the number of cam lobes formed on each ring allows each of the drums to be cast and then machined using standard shop procedures. The angular spacing between eight cam lobes on certain rings will, of course, be 45°, while the angular spacing between cam lobes on rings having four cams is 90° and those having two cams is 180°.

A support rod 461, journaled at both its ends, is mounted in bearings provided on frame 434. Rod 461 is formed with a plurality of notches 462, one notch being provided for each of the cam rings and located for positioning the operating member 463 relative to a cam ring. The operator member 463 is adapted for slidable movement along rod 461 and is secured thereto by means of a pin member 464 that may be engaged with one of the slots 462. Pin 464 is supported by a spring 465 mounted to the operator member, said spring biasing pin 464 toward rod 461 and establishing a connection with any one of the slots with which the pin may be aligned.

Operator member 463 carries a roller member 466 that is positioned for engagement with the surface of one of the cam rings by locating pin 464 in a slot 462, and as the cam lobes of a contacted ring pass under roller 466, the operator 463 is pivoted, causing rod 461 to pivot also. Movement of rod 461 pivots a crank arm 467 that is secured to one end thereof and a screw 468 is threadedly mounted to the arm. The end of screw 468 is adapted for pushing down on a plate member 469 that is positioned above the operators of a pair of normally closed bleeder valves 470 and 471, valve 470 being connected in an air line 472 while valve 471 controls pressure in a line 473. Both air lines 472 and 473 form part of a pneumatic control circuit which determines the length into which the tree trunk is to be sectioned.

Although the operation of the control circuit will be described later, it will be apparent at this time that the air in lines 472 and 473 will be bled through bleeders 470 and 471, respectively, when plate 469 is held down against the operators of each bleeder valve. More particularly, as roller 466 rides over one of the cam lobes provided on a cam ring, operator 463, rod 462 and crank arm 467 are pivoted, moving plate 469 downward until the bleeder valves are opened. Selective positioning of operator 463 along rod 462 opens each of the bleeder valves and control lines 472 and 473 at periodic intervals based on vertical movement of the machine.

The frequency with which operator 463 will be pivoted is obviously a function of the rotation of drums 430, 431 and 432, and the comparative rate at which these drums are rotated is a function of the number of teeth in each of their bevel gears 435, and 436 and 437. It is contemplated that the number of teeth provided in these gears will be in the comparative ratios 5 to 3 and 5 to 2, where the representative ratio number for gear 435 is 5 and the numbers 3 and 2 are representative numbers for the teeth in gears 436 and 437, respectively. Thus, if we assume that the spacing between cam lobes on cam ring 457 operates roller 466 each 2 feet of vertical descent for the machine, then cam rings 453 and 450, both of which provide eight cam lobes, will yield 3 foot and 5 foot sections, respectively, when they are used. It further follows that each ring rotated with cam 457 will produce a trunk section having a length which is a multiple of 2 feet; cam rings that are rotated with ring 453 produce tree trunk sections having a length which is a multiple of 3 feet; and cam rings 451 and 452 which rotate with ring 450 will produce trunk sections having a length which is a multiple of 5 feet.

Although lever 467 and plate 469 are periodically actuated in response to vertical movement of the machine, a second control is provided to operate lever 467 and move plate 469 downwardly when the machine nears the ground. This second control is provided by an inner flexible cable 474 having an outer support housing 475 mounted to the machine. A contact member 476 is secured to the lower end of cable 474, said member being positioned beneath the apparatus for engaging the ground in advance of the machine. Thus, during the machine's descent, and as the tree climbing apparatus approaches the ground, member 476 makes contact with the ground actuating cable 474 and causing plate 469 to be pressed against the operators of bleeder valves 470 and 471. As a consequence, air line 472 will be opened to an exhaust and the machine's descent will be arrested. This operation will become more clearly apparent in view of the following description of the control circuitry.

*Control circuit and operation of machine*

A pneumatic operating circuit for controlling the machine is particularly illustrated in FIG. 53. It will be seen that many of the parts previously described in detail are now shown schematically or symbolically with various control lines that comprise the operating circuit.

The main source of operating pressure is provided by the air pump or compressor 232 which forces air into line 234 through a filter 500 and into a main pressure line 501. An accumulator tank 502 is connected to line 501 for maintaining the line pressure and preventing undesirable variations or undulations in the line pressure, and a relief valve 503 is provided in the main line to maintain a desired maximum lines pressure, as for example 100 p.s.i. A manually operated valve 504 is also provided in the main line for closing off the air supply during a shut down of the machine. Line 501 connects with a valve 505 which is responsive to the pressure in line 506 which is connected to line 501 between valve 505 and the discharge side of manually operated valve 504. Under normal operating conditions, where the pressure in the main line 501 is above the minimum required to operate the circuitry in each of the controlled apparatus, valve 505 provides fluid communication between line 501 and a pressure supply line 507.

It will be seen that the pressure of supply line 507 is simultaneously transmitted to the main control valve 87 via line 508, to air cylinder 109 by way of pressure lines 509 and 121, to a timer controlled valve 510 through lines 509 and 511, to a manually operated valve 512 through a line 513, and to cylinder 200 through line 205. In addition, and since valve 512 is open during normal operation of the machine, the pressure of line 513 is transmitted into an accumulator 514 through lines 515, 516 and 517. Line 515 also transmits pressure into a line 518 connected to a two position valve 386a which forms a part of the valve device 386 having the mechanical operator 388. Similarly, a pressure line 519 provides a pressure connection between line 516 and a two position valve 385a that forms a part of valve device 385 having operator 387.

Opening manually control valve 512 also applies line pressure to a control valve 520. The purpose of this valve being essentially to apply a source of operating pressure into chamber 375 on one side of vane 373 or the other. For purposes of explanation, chamber 375 will be regarded as divided into two parts; that part to the right of vane 373 will be referred to as chamber 1 and the portion to the left will be referred to as chamber 2. Valve 520 also serves to selectively connect either chamber 1 or chamber 2 to an exhaust line 521 having a restriction 522 that may be adjusted for controlling the rate at which air is bled from either chamber.

Valve 520 has a spool that is spring pressed into the position shown connecting the line pressure transmitted through the valve 512 into the pressure line 384 connecting to chamber 1. An application of pressure in a control line 523, however, operates the spool of valve 520 against its spring bias placing the line pressure in fluid communication with pressure line 383 which connects to chamber 2 through a throttling valve 524. The transmission of air pressure through throttling valve 524 is regulated by a fly ball governor 525 that is driven off the main drive shaft 235. So long as shift 235 is rotating at its optimum speed, valve 524 is maintained in a full open position. However, when and as the speed of shaft 235 begins to fall off or decline, the opening through valve 524 is restricted, thereby limiting the amount of air transmitted through line 383 and into chamber 2. The purpose of this arrangement will be later described.

As previously indicated, valve 520 is controlled by the pressure applied through line 523, pressure being supplied into this line through a pair of two position valves 526 and 527. Valve 526 is normally conditioned for transmitting the pressure of a line 528 into a line that interconnects valves 526 and 527, and valve 527 is spring biased to a position transmitting the pressure of line 528 into line 523.

Pressure line 528 connects with a normally closed valve 398, said valve applying pressure into line 528 after the cutting head has been pivoted downwardly into a position where its blade is positioned in a horizontal cutting plane. Thus, valve 398 is opened when the operator 397 is contacted by the surface of housing 390 but is held closed at other times by a spring bias. When open, valve 398 communicates the pressure of line 529 into line 528, the passage of air therethrough being retarded by a restrictor 530, for purposes that will be later explained. Line 529 is supplied with air pressure that is transmitted through valve 385a into line 531 and lines 532 and 533 when vane 373 contacts operator member 387. Line 532 is connected to a two position valve 286b forming a part of valve device 386, and the valve is opened when vane 373 contacts operator member 388. The opening of valve 386b exhausts lines 529 and 531.

A check valve 534 interconnects lines 531 and 533, said valve allowing air to be passed from line 531 to 533 and a pair of lines 535 and 396 but preventing a release of the air pressure in the event that line 531 is opened to an exhaust through valve 386b. Valve 534 is provided with a manual release which allows the air within lines 535 and 396 to be manually bled, said lines being bled after the working cycle is completed. It will be noted that line 535 connects to fluid cylinder 83 and line 396 transmits pressure into the interior of housing 390 on the left side of vane 392 as shown in FIG. 53. For reference purposes, the chamber within housing 390 on the right side of vane 392 will be identified as chamber 3 and the portion on the left side of vane 392 will be referred to as chamber 4.

Valve 526, while normally positioned for transmitting pressure from line 528 to valve 527, is operated to block the transmission of pressure to or from valve 526 when the pressure is applied in a control line 537. The pressure of line 537 is supplied through a line 538 connecting to a valve 385b, also forming a portion of valve device 385, and when line 538 is pressurized its pressure is transmitted into a line 539 that communicates with clutch control line 261 and bleeder line 472. Another pressure line 540 connects the pressure of line 538 to a pneumatically operated counter 541.

Valve 385b is supplied with air pressure through a line 542 connected to an accumulator 543 that is fed through a check valve 544. Valve 544 is connected to a pressure line 404 which is supplied with air through valve 386a each time vane 373 engages the operator 388.

Valve 527 is controlled by the pressure in a safety control line 555 having a manually operated valve 556. Pressure is supplied into line 555 under certain emergency conditions and, more particularly, whenever the pressure in the main line 501 falls below the necessary minimum or in the event that timer valve 510 is opened by the mere lapse of time. It will be seen that where the pressure of the main line falls below the desired minimum, valve 505 connects the main pressure line 501 to line 555 through a lead line 557, and when valve 510 is opened by its timer the pressure of the main supply line 507 is applied through line 511 into line 558, which communicates with line 555.

A two position valve 385c, forming a part of the valve device 385, is connected to air cylinder 124 through the feed line 125 for releasing the tree embracing means. The source of air pressure is brought into valve 385c over pressure line 545 that communicates with line 555 and valve 505.

During the time that the machine is climbing the tree and severing tree limbs, the pressure of line 508 is applied through valve 87 into a line 546 that connects to clutch control line 260 and a pressure line 547. Line 547 communicates with line 395 and chamber 3 of housing 390 through a valve 548 which may be manually set for throttling the flow of air from chamber 3, fully opened to fill chamber 3 rapidly, or entirely closed for retaining pressure in chamber 3. The position of valve 548 will be determined by the purpose and use of the machine which is desired.

Line 547 also communicates with a pressure line 549 that connects to the cylinder 366 for dogging blade 293 in the vertical position. The pressure of lines 547, 395 and 549 is released to an exhaust through a valve 550 when pressure of the main line is applied into safety control line 555, this pressure being transmitted into a valve operating line 551 under such circumstances. However, under normal conditions of operation line 547 is exhausted through a valve 552 that connects line 546 with control line 473 and bleeder valve 471. Valve 552 is operated against a spring bias when valve 87 is positioned for transmitting pressure between lines 508 and 546, the pressure of line 508 being applied to the valve operating cylinder over line 553.

OPERATION OF CIRCUIT

One complete cycle of the machine's operation will now be described in connection with the operating circuitry shown in FIG. 53:

In operation, the tree climbing apparatus and limb cutting machine are mounted together and the tree embracing means is connected around the trunk of a tree, in the manner previously described. Engine 290 is then started causing compressor 232 to feed air into tank 502. During this time, valves 504, 510, 512 and 556 are each closed and each of the valve devices, otherwise shown, is in the condition of operation shown in FIG. 53. After the desired operating pressure has been attained in main line 501, the timer of valve 510 is set and valve 504 is manually opened. Since the operating pressure will be above the necessary minimum, the pressure of line 501 will be transmitted through valve 505 into line 507. The pressure of line 507 is simultaneously applied into lines 508, 509, 121, 511, 513 and 205. Accordingly, air is at this time supplied into cylinder 109 and cylindrical housing 200 of tensioning drum 22. Inasmuch as the piston rod 119 of cylinder 109 is latched, no pressure being supplied into line 125, cylinder 109 will not effect a disconnection in the tree embracing means. The pressure applied to the tensioning drum, however, will cause the flexible connection 23 to be fully wound around the drum until the tree is peripherally engaged by each of the caster wheels and the toothed drive wheels 25 and 26.

While supporting blade 293 in the vertical position, the operator pushes the operator button of valve 87, thereby connecting line 508 with lines 546 and 553 and switching valve 552 to a position that blocks the flow of air from line 546. Air pressure is now transmitted into chamber 3 over lines 546, 547 and 395, valve 548 being previously positioned in a full open position. Simultaneously, pressure is supplied to air cylinder 366 over line 549, dogging blade 293 in the vertical, and pressure is applied to clutching cylinder 230 through line 260, engaging the forward drive clutching plates. After the pressure has been applied into chamber 3, valve 548 is partially closed to a throttling position that reduces the speed at which air might escape from chamber 3 through line 395 compared with exhausting air from cylinder 366 over line 549. Valves 512 and 556 are now fully opened and the machine begins its helical ascent of the tree, severing limbs as it climbs. The height to which the machine will climb will, of course, depend on the circumference of the tree and the setting of the control cams which operate bleeder valves 470 and 471 through an actuation of plate 469.

It will be noted that opening valve 512 transmits line pressure through valve 520 and line 384 into chamber 1. Although the pressure in chamber 1 tends to pivot blade 293 in a clockwise direction, the blade is immobilized by the pin 365 of air cylinder 366.

Opening valve 512 also applies pressure in lines 515, 516, 517, 518, 519 and accumulator 514, and since valves 385a and 386a are each in blocking positions, neither valve transmits air pressure into other connecting pressure lines.

When the machine has climbed to a height where the circumference of the tree is of a predetermined size, operator 86 of valve 87 will be contacted and the valve spool of valve 87 will be moved into the solid line position shown in FIG. 53. Since control line 553 is now opened to an exhaust through valve 87, valve 552 is positioned by its spring bias for transmitting pressure from line 546 into line 473. The pressure in line 473 is maintained until the valve operator of valve 471 is contacted and moved downwardly by plate 469. This operation will occur as previously described at regular intervals of climb based on the operator's selection of a particular length of trunk sectioning. Therefore, the tree climbing apparatus will continue its ascent until plate 469 is actuated by the timing device shown in FIGS. 51 and 52.

When and as plate 469 is moved downwardly and bleeder valve 471 is opened, the pressure in lines 473, 546, 260, 547, 549 and 395 is released. The throttling action of valve 548 is such that chamber 3 is bled through the line 395 at a reduced rate compared to the rate of pressure reduction in cylinder 366 through line 549. As a consequence pin 365, which dogs blade 293 in the vertical cutting position, is retracted before chamber 3 is de-pressurized, and because pressure is already applied in chamber 1, blade 293 is first pivoted on a horizontal axis perpendicular to the vertical cutting plane that the blade then occupies.

The delay in bleeding chamber 3 through valve 548 need only be momentary since the pivotal movement of blade 293 on the horizontal axis perpendicular to the vertical cutting plane requires only a fraction of a second. Thus, it will be seen that blade 293 is pivoted first in its own cutting plane and secondly on the pivot axis of arcuate chamber 390.

The release of pressure in line 260 allows the spring bias of clutching cylinder 230 to move the clutching plates into a neutral position. The upward movement of the machine is thereby arrested. It is to be understood that the release of pressure through valve 471 is not instantaneous, but the machine continues to climb for a short distance. In this short time interval the control cam, then being used in the timing device of FIGS. 51 and 52 will rotate sufficiently so that plate 469 is moved away from the operators of bleeder valves 470 and 471. Furthermore, the inherent inertia of the control mechanism contributes to a small over-run or advance of the machine even after bleeder valve 471 is first opened. In any event, the additional movement of the machine and timer control is sufficient to re-position plate 469 after lines 260, 547, 549 and 395 have each been bled through lines 546 and 473.

As soon as vane 373 contacts the operator 387 of the valve device 385 operating pressure is transmitted from line 519 through the valve 385a and line 531 into control lines 529, 533, 535 and 396. The pressure of line 396 is applied into chamber 4 causing the arcuate housing 390 to pivot downwardly into the broken line position shown in FIG. 53 and bringing the surface of the housing into contact with operator 397 of valve 398. The application of pressure in line 535 is applied to cylinder 83 causing pin 82 to be inserted into the recess formed in collar 66, thereby retaining the toothed drive wheels in the vertical alignment to which they will have been positioned.

As soon as operator 397 is contacted by the surface of housing 390 valve 398 is opened, transmitting the pressure of line 529 into line 528 through the restriction 530, valves 526 and 527 and into the valve operating line 523 of valve 520. Pressure in line 523 operates valve 520 against its spring bias, causing the pressure of line 513 to be redirected into line 383 while connecting line 384 and chamber 1 with exhaust line 521. Line 383 transmits the air supply into chamber 2, pivoting blade 293 to effect the first horizontal cutting operation while topping the tree. The speed at which blade 293 is pivoted is limited by the rate at which air pressure is bled from chamber 1, this bleeding operation being controlled by the variable restriction 522 is line 521. Furthermore, the rate at which air is introduced into chamber 2 is controlled by the speed of engine 290, and when the engine is taxed beyond its ability to rotate drive shaft 235 at optimum speed fly ball governor 525 adjusts throttling valve 524 to reduce the rate at which air is applied into chamber 2.

It will be noted that the contact of vane 373 against operator 387 actuates valves 385b and 385c as well as valve 385a. However, since there is no pressure in line 545 or line 542 at the beginning of the machine's operation, the actuation of the valve spools for valves 385b and 385c is inconsequential at this time.

Now, after blade 293 has topped the tree vane 373 is brought into contact with the operator 388 of valve device 386, thereby changing the positions of valves 386a and 386b. At this time line 529 and 531 are opened to an exhaust through line 532 and valve 386b, and the pressure of line 518 is applied through valve 386a into line 404. The pressure of line 404 is transmitted to air cylinder 400, actuating the piston rod 401, and pressure is applied into accumulator 543 through the check valve 544. As soon as rod 401 of cylinder 400 is fully extended, thereby dislodging the top of the tree from the lower trunk portion, pressure is transmitted from line 404 through valve 403 into line 405, causing the end of the top section to be marked by the spraying device 402.

Since line 528 is connected to line 529 through valve 398, line 528 is also bled or exhausted through line 532 and the valve 386b. However, the restriction 530 in line 528 retards the escape of air from the operator of valve 520. Thus, valve 520 is not operated by its spring bias until after line 404 has been fully pressurized, accumulator 543 has been filled, cylinder 400 has been pressurized, and sprayer 402 has been activated. However, as soon as the pressure in line 528 is exhausted, valve 520 is again positioned as shown in FIG. 53. Air pressure is now again applied into chamber 1 through line 384 and the pressure of line 383 is bled through line 521 and the variable restriction 522. It will be noted that the speed of engine 290 will not be affected during retraction of blade 293 and, therefore, the rotation of fly ball governor 525 will position the variable throttling valve 524 in a full open position, allowing the rapid bleeding of chamber 2 through supply line 383.

As soon as pressure is introduced into chamber 1, blade 293 begins a return pivot on its vertical pivot axis, vane 373 being moved away from operator 388, closing valve 386b and opening line 404 to an exhaust through the valve 386a. Rod 401 of cylinder 400 is immediately retracted by the internal spring bias of the cylinder. Although line 404 is exhausted, pressure is retained in accumulator 543 and line 542 by reason of the check valve 544, which prevents a reverse flow of line pressure from the accumulator.

Blade 293 is pivoted back at a controlled rate that is again determined by the release of pressure from chamber 2 through the variable restriction 522, and as soon as vane 373 contacts operator 387 pressure in line 519 is again applied through the valve 385a into line 531. The pressure of line 531 is transmitted through line 529 and valve 398 into line 528. Simultaneously, the pressure of accumulator 543 is applied through line 542 and valve 385b into lines 536, 537, 539 and 540. Because of the restriction 530 in line 528, no pressure is brought to valve 526 until the valve spool thereof has been moved into its alternate position against the spring bias. The operating pressure for valve 526 is applied through lines 537 and 538.

The pressure of line 539 is transmitted into lines 261 and 472. Line 261 introduces air into a chamber of the clutching cylinder 230 that operates against the spring bias, placing the drive mechanism into a reverse clutching drive connection. The machine then begins a vertical descent until such time that the pressure of line 261 and line 539 is bled through line 472 and bleeder valve 470. This operation occurs after the machine has descended a predetermined amount as determined by the selected cam of the timing device shown in FIGS. 51 and 52. After this descent, plate 469 engages the operator of valve 470 opening line 472 for a period of time sufficient to bleed the pressure from accumulator 543 and lines 542, 537, 538, 539 and 540. The inertia of the control system, or the inherent restriction in line 261, will allow a sufficient over-run of the timing control to re-position plate 469 as to close valves 470 and 471.

The application of pressure to line 538 also introduces pressure to line 540, thereby actuating a pneumatically operated counter 541. It will be seen that line 540 is pressurized together with line 539, and therefore, each time clutching cylinder 230 is operated for engaging a reverse clutching drive connection counter 541 is actuated.

The bleeding of line 539 through valve 470 also bleeds line 537, causing valve 526 to connect the pressure of line 528 with valve operating line 523. Thus, the position of valve 520 is again reversed as to transmit the pressure of line 513 to line 383 while bleeding line 384 through line 521. Blade 293 is now pivoted to effect a second horizontal cut.

The procedure of retracting blade 293 before commencing a second vertical descent is repeated in the manner described above, and the sequence of operation for operating the cylinder 400, the sprayer 402, and the counter 541 is exactly the same. This cycle is then continuously repeated until the tree trunk has been completely sectioned and the apparatus is located at the stump of the tree.

Under normal conditions of operation the machine's vertical descent would be interrupted by an operator stationed near the base of the tree that was being cut. However, in the event that an operator were not present to control the machine, further descent would cease when contact member 476 of flexible cable 474 engaged the ground. At such times plate 469 is moved against the operator of bleeder valve 470, exhausting pressure line 261 and disengaging the drive clutch. Thus, the use of flexible cable 474, as shown, is merely a safety device to prevent the machine from continuing its descent out of control.

A manual shut down of the apparatus is carried out while the apparatus is descending the tree trunk along the last section to be cut. After the machine has severed its next to last section and begins to descend the stump the operator would position the cutting machine in the broken line position shown in FIGS. 38 and 39. Then, as the cutting blade 293 approaches the ground at a desired height, plate 469 is manually actuated against the operators of valves 470 and 471. After the machine's descent has been arrested, by virtue of bleeding line 261 through valve 470, the last horizontal cut would be carried out under control of the circuitry in the ordinary manner. Before the stump has been completely severed, the operator would proceed to deactivate the operating circuit by closing valves 556, 512 and 504, and opening valve 534 to bleed line 533 and its connecting lines 535, 396, 531, 532, 529, 528 and 523. Since chamber 2 remains under pressure, the last horizontal cut is completed automatically.

The operating circuitry described includes safety controls for returning the machine to ground level in the event of a loss of line pressure or if a defect in the operation prolongs the ordinary time required for a complete cycle of operation. Again referring to FIG. 53, a reduction in line pressure below the minimum required to operate the apparatus will cause valve 505 to be operated by its spring bias, connecting line 501 with emergency control line 557. When this occurs, pressure is applied over line 555 to the operator of valve 527, thereby insuring that operator control line 523 is exhausted and valve 520 is positioned as shown. If line 523 had been pressurized, then it is evident that the apparatus would be engaged in a horizontal cutting operation, which occurs when the tree is topped or when a trunk section is being severed. In either event, it is necessary for the blade 293 to be retracted from its cut before the machine is lowered to the ground. Accordingly, bleeding line 523 operates valve 520 to a position that normally applies the main line pressure into chamber 1. However, since no pressure is being directed from line 501 into line 507 at this time, accumulator 514 supplies the necessary operating pressure for retracting blade 293 from its cut. This pressure is applied through lines 517, 516, 515 and thence into line 384. Chamber 2 will, of course, be simultaneously bled through lines 383 and 521.

It is to be further noted that the application of pressure into line 555 will be applied into valve operating line 551 as to move the spool of valve 550 against its spring bias connecting line 549 with an exhaust. If blade 293 is pinned in its vertical cutting position when line 555 is pressurized, pin 365 will be retracted from blade 293, chamber 3 will be exhausted through line 395 and line 549, and the chamber of clutching cylinder 230 this is connected to line 260 will be exhausted through lines 547 and 549. Thus, if the emergency condition arises during the machine's ascent, blade 293 will be un-dogged and swung into its normal horizontal cutting position, and in this condition the machine will be lowered to the ground.

At the time pressure is applied into line 555 from line 557 air pressure is also supplied into line 545, and when the vane 373 contacts the operator 387 valve 385c is moved against its spring bias transmitting pressure from line 545 into line 125 and air cylinder 124, thereby effecting a release of the latching mechanism holding rod 119 of air cylinder 109 in an extended position. A release of the latching mechanism allows cylinder 109 to disconnect flexible connection 23. The toothed drive wheels 25 and 26 are then no longer held into engagement with the tree trunk and the machine as a whole will be lowered to the ground by means of the safety cable 130 and reeling device 136, which provides a controlled rate of descent.

A second safety circuit in provided by the timer controlled valve 510. The timer, it will be realized, is manually set before the machine begins its ascent. If the machine fails to return to ground level within the normal time required to complete a full cycle of operation, valve 510 will be opened at the end of the period to which the timer has been set, and the pressure of line 511 will be transmitted through line 558 into lines 555 and 545. The safety control circuits previously described will then be pressurized in the same manner.

Although a preferred form of the invention has been illustrated and described, it will be apparent that many modifications and changes may be made without departing from the spirit of the invention or the scope of the attached claims. Furthermore, it is to be understood that while the specific embodiment of the invention shown and described is constructed for delimbing and then sectioning a standing tree, portions of the apparatus and machine may be used for merely delimbing a tree, and any modifications or changes of this type is also expressly contemplated.

What I claim is:

1. A machine for delimbing and sectioning a standing tree, comprising: means for climbing and descending a tree; a cutting means; first support means for pivotally mounting said cutting means upon an axis perpendicular to its cutting plane; a second support means for pivotally mounting said first support means and cutting means upon a second pivot axis perpendicular to the first, said second support means being mounted to said tree climbing and descending means; means for selectively pivoting said cutting means upon said first pivot axis; and means for selectively pivoting said cutting means and first support means upon said second pivot axis.

2. The machine of claim 1 and further wherein said means for climbing a tree comprises means for embracing a tree; a plurality of tree engaging toothed wheels rotatably supported from said tree embracing means; means for rotatably driving each toothed wheel; and means for adjusting the angle of horizontal incline of each toothed wheel.

3. The machine of claim 1 and further wherein said means for climbing a tree comprises means for embracing a tree and a plurality of tree engaging toothed wheels, each wheel rotatably supported upon a pivoted and rotatable leg from said tree embracing means; means for rotatably driving each toothed wheel; means for rotatably positioning each leg and adjusting the angle of horizontal incline of each toothed wheel; and means for pivotally positioning each leg and maintaining substantial perpendicular between the axis of leg rotation and the surface of the tree contacted by the wheel it supports.

4. The machine of claim 1 and further wherein said means for climbing a tree comprises means for embracing a tree; a plurality of tree engaging wheels rotatably supported from said tree embracing means; means for rotatably driving each toothed wheel; and means responsive to the peripheral dimension of the tree at the height climbed for adjusting and setting the angle of horizontal incline of each toothed wheel.

5. The machine of claim 4 and further comprising means for locking each toothed wheel when oriented at an angle of climb substantially perpendicular to the horizontal.

6. The machine of claim 4 and further wherein said means responsive to the peripheral dimension of the tree produces a substantially logarithmic spiral of climb, the angle of climb increasing as the machine ascends a tree.

7. The machine of claim 1 and further comprising means for dislodging an upper length of a tree after such length has been severed from a lower portion by actuation of said cutting means.

8. The machine of claim 7 and further comprising means for marking the end of each severed upper length as it is dislodged from the lower portion.

9. The machine of claim 1 and further comprising a parallelogram linkage for mounting said cutting means and said first and second support means to said means for climbing and descending a tree, said linkage being pinned to said second support means and to said means for climbing and descending a tree upon horizontal axes allowing said cutting means to be selectively positioned in parallel upper and lower horizontal cutting positions; and releasable means for locking said linkage to maintain said cutting means in its upper or lower cutting positions, respectively.

10. The machine of claim 1 and further comprising a control means for initiating periodic and alternate actuation of said cutting means and said tree climbing and descending means to effect topping and sectioning of a tree as the machine descends from the point of highest climb.

11. The machine of claim 1 and further comprising a control means responsive to the peripheral diameter of a tree being climbed for limiting the ascent of the machine.

12. The machine of claim 1 and further comprising means for limiting the ascent of the machine as a function of the length of tree sections that are to be cut.

13. The machine of claim 1 and further comprising a control means responsive to the vertical length of machine descent for interrupting the machine's descent and initiating an actuation of said cutting means.

14. The machine of claim 1 wherein said means for climbing a tree comprises means for embracing a tree, a plurality of tree engaging wheels rotatably supported from said tree embracing means, means for rotatably driving each toothed wheel, and means for adjusting and setting the angle of horizontal incline of each toothed wheel; and further including control means for initiating periodic and alternate actuation of said cutting means and said tree climbing and descending means, said control means comprising an analog computer having a rotational input shaft operably connected to and driven by said means for rotatably driving each toothed wheel, a rotational control shaft operably connected to and positioned by said means for adjusting and setting the angle of horizontal incline for each toothed wheel, and a rotational output shaft driven at the rate of vertical climb or descent of the machine; and timing means operably connected to and driven by said output shaft for initiating periodic and alternate actuation of said cutting means and said tree climbing and descending means to effect topping and sectioning of a tree as the machine descends from the point of highest climb.

15. In a machine of the type described, apparatus for climbing and descending a tree comprising: a support; a plurality of toothed drive wheels rotatably mounted from said support; means for rotatably driving said drive wheels; a tensioning drum rotatably mounted to said support; a flexible connection secured at one end to said tensioning drum and disconnectably joined at its other end to the support as to encircle a tree; caster assemblies mounted to said flexible connection and arranged for making contact with the surface of a tree; and means for applying a torque to said tensioning drum to wind up said flexible connection and embrace a tree.

16. The apparatus of claim 15 wherein each drive wheel is rotatably mounted from said support by means allowing adjustment in the angle of climb for each toothed wheel, and further comprising means for adjusting the angle of climb for each toothed wheel.

17. The apparatus of claim 16 and further comprising operating means responsive to the circumference of the tree at the elevation of climb for actuating said means for adjusting the angle of climb for each toothed wheel.

18. The apparatus of claim 17 wherein said operating means responsive to the circumference of the tree comprises a gear box having a driven input shaft connected to and rotationally driven by rotational movement of said drum, said gear box having a driving output shaft connected to said means for adjusting the angle of climb for each toothed wheel.

19. The apparatus of claim 17 wherein said means responsive to the circumference of the tree comprises a resilient drive connection, a gear box having an input shaft and an output shaft on opposite sides of said resilient drive connection, and means for locking the output shaft of said gear box when the toothed wheels are substantially vertically aligned, said resilient drive connection allowing the input shaft of said gear box to rotate relative to a locked output shaft while the apparatus descends a tree.

20. The apparatus of claim 19 wherein said gear box contains a pair of elliptical gears for driving said output shaft in non-linear relationship to the movement of said input shaft, said elliptical gears being formed to produce a logarithmic spiral of climb, the angle of climb increasing as the apparatus ascends a tree.

21. The apparatus of claim 15 wherein said support comprises a plurality of rectangular links articulately joined one to another to form a linkage assembly, said tensioning drum being rotatably mounted to one end link and said flexible connection being disconnectably joined to the other end link.

22. The apparatus of claim 15 wherein each toothed drive wheel is rotatably mounted from said support upon a rotatable leg, and further comprising means for rotatably positioning each leg and adjusting the angle of climb for each toothed wheel.

23. The apparatus of claim 15 wherein each toothed drive wheel is rotatably mounted from said support upon a pivoted and rotatable leg, and further comprising means for rotatably driving each toothed wheel; means for rotatably positioning each leg and adjusting the angle of climb for each toothed wheel; and means for pivotally positioning each leg and maintaining substantial perpendicularity between the axis of leg rotation and the surface of the tree contacted by the wheel it supports.

24. The apparatus of claim 15 wherein each toothed drive wheel is rotatably mounted from said support upon a rotatable leg, and further comprising means for rotatably positioning each leg and adjusting the angle of horizontal incline of each toothed wheel; and means for displacing each leg horizontally relative to said support for maintaining substantial perpendicularity between the axis of leg rotation and the surface of the tree contacted by the wheel it supports.

25. The apparatus of claim 24 wherein each leg is mounted to a traveling block supported upon a screw, said screw being rotatably mounted to said support upon a horizontal axis, and further wherein said means for displacing each leg horizontally comprises means for rotating said screw.

26. The apparatus of claim 24 wherein each leg is mounted to a pivoted arm, said arm being pivoted from said support upon a horizontal axis, and further wherein said means for displacing each leg horizontally comprises means for rotatably positioning said pivot arm upon said horizontal axis.

27. The apparatus of claim 15 wherein each caster assembly is mounted to said flexible connection by means comprising a vertical support arm secured to said flexible connection and a spring support rotatably mounted at one end to said arm upon a horizontal axis and having its other end secured to a caster assembly.

28. The apparatus of claim 15 and further including means for effecting a disconnection between said flexible connection and said support; and safety means for lowering the apparatus including a flexible line that encircles the tree and a time controlled reel for paying out said flexible line at a controlled rate.

29. In apparatus for climbing and descending a tree and having a toothed drive wheel rotatably mounted thereto by means allowing adjustment in the angle of climb, drive means for adjusting the angle of climb for the toothed drive wheel comprising: a support housing, an input shaft rotatably mounted in said housing, a gear rotatably mounted coaxial with said input shaft and drivingly connected thereto by means of a yieldable drive spring, an output shaft rotatably mounted in said housing, means for rotating said output shaft in synchronism with said gear, and means for locking said output shaft against rotation, said drive spring allowing said input shaft to rotate while said output shaft is locked.

30. The apparatus of claim 29 wherein said means for rotating said output shaft comprises a pair of elliptical gears for driving said output shaft in non-linear relationship to the movement of said input shaft, said elliptical gears being formed to produce a logarithmic spiral of climb, the angle of climb increasing as the apparatus ascends a tree.

31. In apparatus for climbing and descending a tree and having a toothed drive wheel rotatably mounted thereto by means allowing adjustment in the angle of climb and in the angle of support, drive means for adjusting the angle of climb and maintaining substantial perpendicularity between the axis of support and the surface of a tree, comprising: a support housing, an input shaft rotatably mounted in said housing, a gear rotatably mounted coaxial with said input shaft and drivingly connected thereto by means of a yieldable drive spring, a first output shaft rotatably mounted in said housing, means for rotating said output shaft in synchronism with said gear, means for locking said first output shaft against rotation, a second output shaft rotatably mounted in said housing, and means drivingly connecting said input shaft to said second output shaft, said drive spring allowing said input and second output shafts to rotate while said first output shaft is locked.

32. In a machine of the kind described having a toothed drive wheel and a cutting means, apparatus for initiating a cutting operation of the machine, comprising: a computer having an input linearly proportional to the rotation of the toothed drive wheel, a control linearly proportional to the angle of incline of the toothed wheel, and an output linearly proportional to the vertical length of a tree traveled by the machine; and means responsive to the output of said computer for operating a control circuit after said machine travels a predetermined length.

33. The combination of claim 32 wherein said means for operating a control circuit comprises a plurality of cams, each cam having one or more lobes differing in number from the other cams, those cams having more than one lobe being formed with lobes that are spaced a predetermined equal distance apart; means for rotating said cams in response to the output of said computer; a cam follower mounted for selective engagement with the peripheral surface of one of said cams; and means actuated by said cam follower for operating a control circuit to initiate a cutting operation.

34. The combination of claim 32 wherein said means for operating a control circuit comprises a plurality of concentric cams rotatably mounted relative to each other upon a common axis, each of said cams having a peripheral cam surface formed with one or more cam lobes, those cams having more than one lobe being formed with lobes that are spaced a predetermined equal distance apart; means for selectively rotating one of said cams in response to the output of said computer; a cam follower mounted for selective engagement with a peripheral surface of one of said cams; and means actuated by said cam follower for operating a control circuit to initiate a cutting operation.

35. The combination of claim 34 wherein said means for selectively rotating one of said cams comprises a plurality of concentric bevel gears, one of said bevel gears being mounted to respective cams; and a bevel gear mounted on a rotatable drive shaft, said bevel gear being selectively positionable along said shaft for engagement with any one of said concentric bevel gears.

36. A timing device comprising: a plurality of concentric cams rotatably mounted relative to each other upon a common axis, each cam having one or more lobes differing in number from the other cams, those cams having more than one lobe being formed with lobes that are spaced a predetermined equal distance apart; a plurality of gears, one gear mounted coaxially to each cam, respectively; a drive gear mounted for selective engagement with the gear of one of said concentric cams; a cam follower mounted for selective engagement with the peripheral surface of one of said cams; and means actuated by said cam follower for periodically operating a control in timed relation to rotation of said drive gear.

37. The timing device of claim 36 wherein said plurality of gears and drive gear are bevel gears, said drive gear being mounted on a rotatable drive shaft and being selectively positionable along said shaft for engagement with any one of said plurality of gears.

38. A method for delimbing and sectioning a standing tree comprising the steps of: moving a cutting means in a helical path up a tree while severing the limbs from the trunk of the tree; topping the tree trunk; and then, alternately, moving the cutting means down the tree trunk and progressively sectioning the tree trunk.

39. A method for delimbing and sectioning a standing tree comprising the steps of: placing the cutting edge of a cutting means in a substantially vertical plane; moving the cutting means in a helical path up a tree while severing the tree limbs from the tree trunk; turning the cutting means and placing the cutting edge in a substantially horizontal plane; and progressively topping the tree and severing the trunk into sections as the cutting means is moved periodically down the tree trunk.

40. The method of claim 39 wherein the helical path of the cutting means is a logarithmic spiral, the angle of climb increasing in the direction of climb.

41. The method of claim 39 wherein the cutting means is moved periodically down the tree trunk in a substantially vertical descent.

42. A method for delimbing a standing tree comprising the steps of: mounting a chain saw with its blade in a vertical plane and its cutting edge disposed substantially tangential to the surface of a tree, and moving the chain saw in a helical path up the tree while maintaining the cutting edge substantially tangential relative to the tree.

43. The method of claim 42 wherein the helical path of the chain saw is a logarithmic spiral, the angle of climb increasing in the direction of climb as the chain saw is moved up the tree.

44. In apparatus of the kind described, a belt tensioning device comprising: a support, a cylindrical drum having a movable diaphragm enclosing one end of said drum and defining an enclosed pressure chamber; means for rotatably supporting said drum from said support; means for applying fluid pressure into said drum chamber for moving said diaphragm within said drum; and means for translating the movement of said diaphragm to rotational movement of said drum, said drum being rotationally biased by the pressure within said chamber.

45. The belt tensioning device of claim 44 wherein said translating means comprises a first gear coaxially secured to said support on the rotational axis of said drum; gear means rotationally mounted to said drum and enmeshed with said first gear; and means for rotating said gear means as said diaphragm is moved longitudinally relative to the rotational axis of said drum.

46. In a machine of the type described, apparatus for climbing and descending a tree comprising: a support; a plurality of toothed drive wheels rotatably mounted from said support; means for rotatably driving said drive wheels; an expandable connection for encircling a tree, said connection comprising a plurality of pivotally connected links forming a belt; caster assemblies mounted to said flexible connection and arranged for making contact with the surface of a tree; and means on said support for pivoting at least one pair of pivotally connected links to selectively expand or contract said belt.

47. The apparatus of claim 46 wherein one of said drive wheels is supported on a bar mounted to the means for pivoting a pair of pivotally connected links, the end of one link being pivotally connected to said bar.

References Cited
UNITED STATES PATENTS

| | | | |
|---|---|---|---|
| 2,477,922 | 8/1949 | Emery et al. | |
| 2,487,392 | 9/1949 | Whitaker. | |
| 2,612,724 | 10/1952 | Llewellyn | 144—208 |
| 3,315,714 | 4/1967 | Meier | 144—2 |

WILLIAM W. DYER, Jr. *Primary Examiner.*

W. D. BRAY, *Assistant Examiner.*